US012236068B2

(12) United States Patent
Corbin et al.

(10) Patent No.: US 12,236,068 B2
(45) Date of Patent: *Feb. 25, 2025

(54) CONTINUOUS PLAYBACK QUEUE

(71) Applicant: Sonos, Inc., Santa Barbara, CA (US)

(72) Inventors: Keith Corbin, Boston, MA (US); Steven Beckhardt, Lexington, MA (US); Arthur L. Coburn, IV, Boston, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,443

(22) Filed: Nov. 27, 2023

(65) Prior Publication Data

US 2024/0103702 A1  Mar. 28, 2024

Related U.S. Application Data

(63) Continuation of application No. 16/995,339, filed on Aug. 17, 2020, now Pat. No. 11,880,553, which is a
(Continued)

(51) Int. Cl.
*G06F 3/04842* (2022.01)
*H04N 21/262* (2011.01)
(Continued)

(52) U.S. Cl.
CPC ... *G06F 3/04842* (2013.01); *H04N 21/26258* (2013.01); *H04N 21/4622* (2013.01);
(Continued)

(58) Field of Classification Search
CPC ............... G06F 3/04842; G06F 3/0482; G06F 2203/04803; H04N 21/26258;
(Continued)

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| CN | 1677920 A | 10/2005 |
| CN | 101247409 A | 8/2008 |

(Continued)

OTHER PUBLICATIONS

International Bureau, International Preliminary Report on Patentability mailed on Dec. 15, 2016, issued in connection with International Application No. PCT/US2015/033008, filed on May 28, 2015, 16 pages.

(Continued)

*Primary Examiner* — Hau H Hoang
(74) *Attorney, Agent, or Firm* — FORTEM IP LLP

(57) ABSTRACT

Embodiments are described herein that involve a media playback system playing back a playback queue according to a continuous-playback mode. In one aspect, a playback device is provided that includes a network interface, one or more media processing components, and a non-transitory computer-readable medium with program instructions stored thereon. The program instructions are executable by at least one processor to cause the media playback device to: add one or more items to a playback queue of the media playback device, where the one or more items include a continuous-playback item including at least one media item, play back the playback queue according to a continuous-playback mode, where playing back the playback queue according to the continuous-playback mode involves: detecting a continuous-playback trigger, and based on the detected continuous-playback trigger, adding at least one additional media item to the continuous-playback item.

20 Claims, 9 Drawing Sheets

Related U.S. Application Data continuation of application No. 15/939,700, filed on Mar. 29, 2018, now Pat. No. 10,747,409, which is a continuation of application No. 14/475,093, filed on Sep. 2, 2014, now abandoned.

(60) Provisional application No. 62/027,214, filed on Jul. 21, 2014, provisional application No. 62/007,906, filed on Jun. 4, 2014.

(51) Int. Cl.

| | | |
|---|---|---|
| *H04N 21/462* | (2011.01) | |
| *H04N 21/482* | (2011.01) | |
| *H04N 21/81* | (2011.01) | |
| *G06F 3/0482* | (2013.01) | |
| *H04N 21/436* | (2011.01) | |

(52) U.S. Cl.
CPC ..... *H04N 21/4825* (2013.01); *H04N 21/8113* (2013.01); *G06F 3/0482* (2013.01); *G06F 2203/04803* (2013.01); *H04N 21/43615* (2013.01)

(58) Field of Classification Search
CPC ........... H04N 21/4622; H04N 21/4825; H04N 21/8113; H04N 21/43615
See application file for complete search history.

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,587,127 B1 | 7/2003 | Leeke et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 6,934,269 B1 | 8/2005 | Hasha et al. |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,797,446 B2 | 9/2010 | Heller et al. |
| 7,805,682 B1 | 9/2010 | Lambourne |
| 7,827,259 B2 | 11/2010 | Heller et al. |
| 7,853,341 B2 | 12/2010 | McCarty et al. |
| 7,958,441 B2 | 6/2011 | Heller et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,204,890 B1 | 6/2012 | Gogan |
| 8,234,395 B2 | 7/2012 | Millington |
| 8,370,952 B1 | 2/2013 | Wieder |
| 8,483,853 B1 | 7/2013 | Lambourne |
| 8,516,093 B2 | 8/2013 | Bank |
| 8,818,538 B2 | 8/2014 | Sakata |
| 8,942,252 B2 | 1/2015 | Balassanian et al. |
| 9,226,013 B2 | 12/2015 | Fishwick |
| 9,282,403 B1 | 3/2016 | Torok et al. |
| 9,286,384 B2 | 3/2016 | Kuper et al. |
| 9,363,254 B2 | 6/2016 | Beckhardt et al. |
| 9,363,255 B2 | 6/2016 | Coburn, IV |
| 9,374,607 B2 | 6/2016 | Bates et al. |
| 9,485,576 B2 | 11/2016 | Gautama et al. |
| 9,537,852 B2 | 1/2017 | Beckhardt et al. |
| 9,558,751 B2 | 1/2017 | Mufti et al. |
| 9,648,070 B2 | 5/2017 | Beckhardt et al. |
| 9,648,071 B2 | 5/2017 | Coburn, IV |
| 9,654,459 B2 | 5/2017 | Coburn, IV et al. |
| 9,654,536 B2 | 5/2017 | Coburn, IV et al. |
| 9,654,821 B2 | 5/2017 | Coburn, IV et al. |
| 9,703,521 B2 | 7/2017 | Kumar et al. |
| 9,729,599 B2 | 8/2017 | Beckhardt et al. |
| 10,158,619 B2 | 12/2018 | Beckhardt et al. |
| 10,587,602 B2 | 3/2020 | Coburn, IV et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0051148 A1 | 3/2003 | Garney |
| 2003/0157951 A1 | 8/2003 | Hasty, Jr. |
| 2004/0024478 A1 | 2/2004 | Hans et al. |
| 2004/0139222 A1 | 7/2004 | Slik et al. |
| 2004/0215611 A1 | 10/2004 | Jawa et al. |
| 2005/0038996 A1 | 2/2005 | Meyerson |
| 2005/0240661 A1 | 10/2005 | Heller et al. |
| 2006/0242106 A1 | 10/2006 | Bank |
| 2007/0038999 A1 | 2/2007 | Millington |
| 2007/0129005 A1 | 6/2007 | Goldberg et al. |
| 2007/0142944 A1 | 6/2007 | Goldberg et al. |
| 2007/0219910 A1 | 9/2007 | Martinez |
| 2008/0177822 A1 | 7/2008 | Yoneda |
| 2008/0229215 A1 | 9/2008 | Baron et al. |
| 2009/0087167 A1 | 4/2009 | Seisun et al. |
| 2009/0171487 A1 | 7/2009 | Wilhelm |
| 2009/0199120 A1 | 8/2009 | Baxter et al. |
| 2009/0249222 A1 | 10/2009 | Schmidt et al. |
| 2010/0075313 A1 | 3/2010 | Kreuwel et al. |
| 2010/0281178 A1 | 11/2010 | Sullivan |
| 2011/0004330 A1 | 1/2011 | Rothkopf et al. |
| 2011/0040658 A1 | 2/2011 | Gautier et al. |
| 2011/0058675 A1 | 3/2011 | Brueck et al. |
| 2011/0107213 A1 | 5/2011 | Johnson et al. |
| 2011/0161485 A1 | 6/2011 | George et al. |
| 2011/0276155 A1 | 11/2011 | Lindahl |
| 2011/0307927 A1 | 12/2011 | Nakano et al. |
| 2012/0005380 A1 | 1/2012 | Batson et al. |
| 2012/0088477 A1 | 4/2012 | Cassidy |
| 2012/0089910 A1 | 4/2012 | Cassidy |
| 2012/0106750 A1 | 5/2012 | Thormundsson et al. |
| 2012/0117026 A1 | 5/2012 | Cassidy |
| 2012/0144445 A1 | 6/2012 | Bonta et al. |
| 2012/0290932 A1 | 11/2012 | Johnson |
| 2012/0321087 A1 | 12/2012 | Fleischman et al. |
| 2012/0324552 A1 | 12/2012 | Padala et al. |
| 2013/0073584 A1 | 3/2013 | Kuper et al. |
| 2013/0174204 A1 | 7/2013 | Coburn, IV et al. |
| 2013/0188924 A1 | 7/2013 | Morris |
| 2013/0219178 A1 | 8/2013 | Xiques et al. |
| 2013/0253679 A1 | 9/2013 | Lambourne |
| 2013/0317635 A1 | 11/2013 | Bates et al. |
| 2013/0326041 A1 | 12/2013 | Bellet et al. |
| 2013/0346859 A1 | 12/2013 | Bates et al. |
| 2014/0074959 A1 | 3/2014 | Alsina et al. |
| 2014/0075308 A1 | 3/2014 | Sanders et al. |
| 2014/0075513 A1 | 3/2014 | Trammel et al. |
| 2014/0094943 A1 | 4/2014 | Bates et al. |
| 2014/0115114 A1 | 4/2014 | Garmark et al. |
| 2014/0123006 A1 | 5/2014 | Chen et al. |
| 2014/0181107 A1 | 6/2014 | Coburn, IV et al. |
| 2014/0189648 A1 | 7/2014 | Everitt |
| 2014/0282772 A1 | 9/2014 | Chen et al. |
| 2014/0282882 A1 | 9/2014 | Tsui et al. |
| 2014/0310316 A1 | 10/2014 | Coburn, IV et al. |
| 2015/0098576 A1 | 4/2015 | Sundaresan et al. |

FOREIGN PATENT DOCUMENTS

| | | |
|---|---|---|
| CN | 101911038 A | 12/2010 |
| CN | 102104623 A | 6/2011 |

(56) References Cited

FOREIGN PATENT DOCUMENTS

| | | |
|---|---|---|
| CN | 201928306 U | 8/2011 |
| CN | 102215115 A | 10/2011 |
| CN | 103369369 A | 10/2013 |
| CN | 103812828 A | 5/2014 |
| CN | 103827912 A | 5/2014 |
| EP | 1389853 A1 | 2/2004 |
| EP | 2779529 A1 | 9/2014 |
| JP | 2002044765 A | 2/2002 |
| JP | 2006524874 A | 11/2006 |
| JP | 2007264922 A | 10/2007 |
| JP | 2013247591 A | 12/2013 |
| JP | 2016537873 A | 12/2016 |
| WO | 200153994 | 7/2001 |
| WO | 2003093950 A2 | 11/2003 |
| WO | 2012115742 | 8/2012 |
| WO | 2012137190 A1 | 10/2012 |
| WO | 2013043958 A2 | 3/2013 |
| WO | 2014004181 A1 | 1/2014 |
| WO | 2014039163 A1 | 3/2014 |
| WO | 2014071801 A1 | 5/2014 |
| WO | 2015031703 A1 | 3/2015 |

OTHER PUBLICATIONS

International Searching Authority, International Search Report and Written Opinion mailed on Sep. 7, 2015, issued in connection with International Application No. PCT/US2015/033008, filed on May 28, 2015, 19 pages.
International Searching Authority, International Search Report and Written Opinion mailed on Aug. 12, 2015, issued in connection with International Application No. PCT/US2015/031930, filed on May 21, 2015, 12 pages.
International Searching Authority, International Search Report and Written Opinion mailed on Jul. 20, 2015, issued in connection with International Application No. PCT/US2015/031756, filed on May 20, 2015, 12 pages.
International Searching Authority, International Search Report and Written Opinion mailed on Aug. 27, 2015, issued in connection with International Application No. PCT/US2015/033003, filed on May 28, 2015, 20 pages.
Japanese Patent Office, Office Action mailed on May 9, 2017, issued in connection with Japanese Patent Application No. 2016-570965, 7 pages.
Japanese Patent Office, Office Action mailed on Jun. 13, 2017, issued in connection with Japanese patent application No. 2016-571113, 5 pages.
Japanese Patent Office, Translation of Office Action mailed on May 9, 2017, issued in connection with Japanese Patent Application No. 2016-570965, 4 pages.
Japanese Patent Office, Translation of Office Action mailed on Jun. 13, 2017, issued in connection with Japanese Patent Application No. 2016-571113, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Feb. 1, 2017, issued in connection with U.S. Appl. No. 14/616,319, filed Feb. 6, 2015, 26 pages.
Non-Final Office Action mailed on Aug. 9, 2017, issued in connection with U.S. Appl. No. 15/288,754, filed Oct. 7, 2016, 14 pages.
Non-Final Office Action mailed on May 1, 2017, issued in connection with U.S. Appl. No. 14/475,093, filed Sep. 2, 2014, 10 pages.
Non-Final Office Action mailed on May 1, 2024, issued in connection with U.S. Appl. No. 16/812,672, filed Mar. 9, 2020, 24 pages.
Non-Final Office Action mailed on Sep. 1, 2020, issued in connection with U.S. Appl. No. 16/812,672, filed Mar. 9, 2020, 15 pages.
Non-Final Office Action mailed on Sep. 1, 2021, issued in connection with U.S. Appl. No. 16/882,678, filed May 25, 2020, 17 pages.
Non-Final Office Action mailed on Jan. 10, 2019, issued in connection with U.S. Appl. No. 16/143,041, filed Sep. 26, 2018, 13 pages.
Non-Final Office Action mailed on Jul. 10, 2017, issued in connection with U.S. Appl. No. 15/477,912, filed Apr. 3, 2017, 7 pages.
Non-Final Office Action mailed on Sep. 12, 2016, issued in connection with U.S. Appl. No. 14/475,093, filed Sep. 2, 2014, 26 pages.
Non-Final Office Action mailed on Sep. 13, 2021, issued in connection with U.S. Appl. No. 16/812,672, filed Mar. 9, 2020, 17 pages.
Non-Final Office Action mailed on Sep. 14, 2023, issued in connection with U.S. Appl. No. 16/812,672, filed Mar. 9, 2020, 26 pages.
Non-Final Office Action mailed on Apr. 17, 2018, issued in connection with U.S. Appl. No. 15/099,813, filed Apr. 15, 2016, 13 pages.
Non-Final Office Action mailed on Aug. 17, 2022, issued in connection with U.S. Appl. No. 16/882,678, filed May 25, 2020, 22 pages.
Non-Final Office Action mailed on Oct. 17, 2016, issued in connection with U.S. Appl. No. 15/099,846, filed Aug. 15, 2016, 6 pages.
Non-Final Office Action mailed on Aug. 18, 2022, issued in connection with U.S. Appl. No. 16/812,672, filed Mar. 9, 2020, 24 pages.
Non-Final Office Action mailed on Oct. 2, 2020, issued in connection with U.S. Appl. No. 16/882,678, filed May 25, 2020, 16 pages.
Non-Final Office Action mailed on Nov. 20, 2018, issued in connection with U.S. Appl. No. 16/143,057, filed Sep. 26, 2018, 7 pages.
Non-Final Office Action mailed on May 21, 2018, issued in connection with U.S. Appl. No. 15/477,988, filed Apr. 3, 2017, 9 pages.
Non-Final Office Action mailed on Sep. 23, 2016, issued in connection with U.S. Appl. No. 15/130,672, filed Apr. 15, 2016, 6 pages.
Non-Final Office Action mailed on Sep. 24, 2019, issued in connection with U.S. Appl. No. 16/143,284, filed Sep. 26, 2018, 12 pages.
Non-Final Office Action mailed on Jan. 25, 2019, issued in connection with U.S. Appl. No. 16/143,021, filed Sep. 26, 2018, 8 pages.
Non-Final Office Action mailed on Jul. 3, 2019, issued in connection with U.S. Appl. No. 16/372,743, filed Apr. 2, 2019, 9 pages.
Notice of Allowance mailed on Dec. 1, 2016, issued in connection with U.S. Appl. No. 14/616,341, filed Feb. 6, 2015, 5 pages.
Notice of Allowance mailed on Jul. 1, 2016, issued in connection with U.S. Appl. No. 14/616,310, filed Feb. 6, 2015, 9 pages.
Notice of Allowance mailed on Jan. 3, 2017, issued in connection with U.S. Appl. No. 15/099,846, filed Apr. 15, 2016, 5 pages.
Notice of Allowance mailed on Jan. 3, 2017, issued in connection with U.S. Appl. No. 15/130,672, filed Apr. 15, 2016, 5 pages.
Notice of Allowance mailed on Jan. 5, 2017, issued in connection with U.S. Appl. No. 14/616,332, filed Feb. 6, 2015, 5 pages.
Notice of Allowance mailed on Apr. 7, 2016, issued in connection with U.S. Appl. No. 14/616,325, filed Feb. 6, 2015, 5 pages.
Notice of Allowance mailed on Apr. 8, 2016, issued in connection with U.S. Appl. No. 14/616,364, filed Feb. 6, 2015, 6 pages.
Notice of Allowance mailed on May 1, 2019, issued in connection with U.S. Appl. No. 16/143,021, filed Sep. 26, 2018, 5 pages.
Notice of Allowance mailed on May 1, 2019, issued in connection with U.S. Appl. No. 16/143,041, filed Sep. 26, 2018, 7 pages.
Notice of Allowance mailed on Mar. 10, 2017, issued in connection with U.S. Appl. No. 14/616,341, filed Feb. 6, 2015, 5 pages.
Notice of Allowance mailed on Jul. 11, 2018, issued in connection with U.S. Appl. No. 15/477,912, filed Apr. 3, 2017, 5 pages.
Notice of Allowance mailed on Sep. 11, 2018, issued in connection with U.S. Appl. No. 15/099,813, filed Apr. 15, 2016, 7 pages.

(56) References Cited

OTHER PUBLICATIONS

Notice of Allowance mailed on Jun. 12, 2019, issued in connection with U.S. Appl. No. 16/143,041, filed Sep. 26, 2018, 5 pages.
Notice of Allowance mailed on Feb. 14, 2019, issued in connection with U.S. Appl. No. 16/143,057, filed Sep. 26, 2018, 5 pages.
Notice of Allowance mailed on May 17, 2017, issued in connection with U.S. Appl. No. 14/616,319, filed Feb. 6, 2015, 9 pages.
Notice of Allowance mailed on Jul. 18, 2016, issued in connection with U.S. Appl. No. 14/616,332, filed Feb. 6, 2015, 7 pages.
Advisory Action mailed on Jan. 12, 2017, issued in connection with U.S. Appl. No. 14/475,093, filed Sep. 2, 2014, 11 pages.
Advisory Action mailed on Nov. 29, 2017, issued in connection with U.S. Appl. No. 14/475,093, filed Sep. 2, 2014, 14 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Office Action, Office Action mailed on Jan. 31, 2018, issued in connection with Chinese Application No. 201580041535.6, 9 pages.
Chinese Patent Office, First Office Action and Translation mailed on May 17, 2021, issued in connection with Chinese Application No. 201811599986.3, 12 pages.
Chinese Patent Office, First Office Action and Translation mailed on Nov. 24, 2022, issued in connection with Chinese Application No. 201810784436.2, 16 pages.
Chinese Patent Office, First Office Action with Translation mailed on Sep. 30, 2017, issued in connection with Chinese Patent Application No. 201580041499.3, 5 pages.
Chinese Patent Office, Office Action mailed on Oct. 15, 2020, issued in connection with Chinese Application No. 201810784436.2, 17 pages.
Chinese Patent Office, Second Office Action and Translation mailed on Sep. 3, 2021, issued in connection with Chinese Application No. 201810784436.2, 17 pages.
Chinese Patent Office, Second Office Action mailed on Apr. 20, 2018, issued in connection with Chinese Application No. 2015800415356, 7 pages.
Chinese Patent Office, Second Office Action with Translation mailed on Jan. 10, 2018, issued in connection with Chinese Patent Application No. 201580041499.3, 15 pages.
Corrected Notice of Allowability mailed on Aug. 25, 2016, issued in connection with U.S. Appl. No. 14/616,332, filed Feb. 6, 2015, 2 pages.
Corrected Notice of Allowability mailed on Nov. 29, 2016, issued in connection with U.S. Appl. No. 14/616,310, filed Feb. 6, 2015, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, Decision to Refuse European Patent Application mailed on Jun. 17, 2020, issued in connection with European Application No. 15803358.9, 14 pages.
European Patent Office, European EPC Article 94.3 mailed on Sep. 12, 2023, issued in connection with European Application No. 20192949.4, 9 pages.
European Patent Office, European EPC Article 94.3 mailed on Mar. 17, 2023, issued in connection with European Application No. 20172493.7, 13 pages.
European Patent Office, European EPC Article 94.3 mailed on Aug. 9, 2022, issued in connection with European Application No. 20192949.4, 6 pages.
European Patent Office, European Extended Search Report mailed on Jul. 19, 2017, issued in connection with EP Application No. 15803347.2, 14 pages.
European Patent Office, European Extended Search Report mailed on Mar. 22, 2021, issued in connection with European Application No. 20192949.4, 13 pages.
European Patent Office, European Extended Search Report mailed on Jul. 27, 2017, issued in connection with EP Application No. 15802676.5, 12 pages.
European Patent Office, European Extended Search Report mailed on Jul. 28, 2017, issued in connection with EP Application No. 15803358.9, 14 pages.
European Patent Office, European Extended Search Report mailed on Oct. 9, 2020, issued in connection with European Application No. 20172493.7, 16 pages.
European Patent Office, European Office Action mailed on Sep. 21, 2018, issued in connection with European Application No. 158033589, 8 pages.
European Patent Office, European Office Action mailed on Sep. 3, 2018, issued in connection with European Application No. 15803222.7, 8 pages.
European Patent Office, European Summons to Attend Oral Proceedings mailed on Mar. 15, 2024, issued in connection with European Application No. 20192949.4, 8 pages.
European Patent Office, European Supplemental Search Report mailed on Sep. 20, 2017, issued in connection with EP Application No. 158032227, 11 pages.
European Patent Office, Summons to Attend Oral Proceedings mailed on Dec. 19, 2019, issued in connection with European Application No. 15803358.9, 12 pages.
Final Office Action mailed Apr. 5, 2021, issued in connection with U.S. Appl. No. 16/882,678, filed May 25, 2020, 20 pages.
Final Office Action mailed on Nov. 3, 2016, issued in connection with U.S. Appl. No. 14/616,319, filed Feb. 6, 2015, 23 pages.
Final Office Action mailed on Oct. 3, 2016, issued in connection with U.S. Appl. No. 14/616,341, filed Feb. 6, 2015, 18 pages.
Final Office Action mailed on Mar. 1, 2018, issued in connection with U.S. Appl. No. 15/477,912, filed Apr. 3, 2017, 6 pages.
Final Office Action mailed on Aug. 16, 2017, issued in connection with U.S. Appl. No. 14/475,093, filed Sep. 2, 2014, 16 pages.
Final Office Action mailed on Oct. 19, 2016, issued in connection with U.S. Appl. No. 14/475,093, filed Sep. 2, 2014, 30 pages.
Final Office Action mailed on Feb. 22, 2021, issued in connection with U.S. Appl. No. 16/812,672, filed Mar. 9, 2020, 22 pages.
Final Office Action mailed on Mar. 4, 2022, issued in connection with U.S. Appl. No. 16/882,678, filed May 25, 2020, 18 pages.
Final Office Action mailed on Feb. 6, 2023, issued in connection with U.S. Appl. No. 16/882,678, filed May 25, 2020, 25 pages.
Final Office Action mailed on Feb. 7, 2022, issued in connection with U.S. Appl. No. 16/812,672, filed Mar. 9, 2020, 27 pages.
Final Office Action mailed on Mar. 9, 2022, issued in connection with U.S. Appl. No. 16/812,672, filed Mar. 9, 2020, 18 pages.
First Action Interview Office Action mailed on Jun. 10, 2016, issued in connection with U.S. Appl. No. 14/616,319, filed Feb. 6, 2015, 7 pages.
First Action Interview Office Action mailed on Aug. 18, 2016, issued in connection with U.S. Appl. No. 14/485,602, filed Sep. 12, 2014, 15 pages.
International Bureau, International Preliminary Report on Patentability mailed on Dec. 15, 2016, issued in connection with International Application No. PCT/US2015/031756, filed on May 20, 2015, 9 pages.
International Bureau, International Preliminary Report on Patentability mailed on Dec. 15, 2016, issued in connection with International Application No. PCT/US2015/031930, filed on May 21, 2015, 9 pages.
International Bureau, International Preliminary Report on Patentability mailed on Dec. 15, 2016, issued in connection with International Application No. PCT/US2015/033003, filed on May 28, 2015, 17 pages.
Notice of Allowance mailed on Mar. 20, 2017, issued in connection with U.S. Appl. No. 14/485,602, filed Sep. 12, 2014, 9 pages.
Notice of Allowance mailed on Jan. 23, 2018, issued in connection with U.S. Appl. No. 15/288,754, filed Oct. 7, 2016, 5 pages.
Notice of Allowance mailed on Nov. 23, 2016, issued in connection with U.S. Appl. No. 14/485,602, filed Sep. 12, 2014, 9 pages.

(56) References Cited

OTHER PUBLICATIONS

Notice of Allowance mailed on Oct. 23, 2018, issued in connection with U.S. Appl. No. 15/477,912, filed Apr. 3, 2017, 5 pages.
Notice of Allowance mailed on Jan. 24, 2020, issued in connection with U.S. Appl. No. 16/143,284, filed Sep. 26, 2018, 5 pages.
Notice of Allowance mailed on Nov. 27, 2017, issued in connection with U.S. Appl. No. 15/297,995, filed Oct. 19, 2016, 5 pages.
Notice of Allowance mailed on Oct. 29, 2019, issued in connection with U.S. Appl. No. 16/372,743, filed Apr. 2, 2019, 5 pages.
Notice of Allowance mailed on Aug. 31, 2023, issued in connection with U.S. Appl. No. 16/995,339, filed Aug. 17, 2020, 7 pages.
Notice of Allowance mailed on Aug. 4, 2023, issued in connection with U.S. Appl. No. 16/882,678, filed May 25, 2020, 13 pages.
Notice of Allowance mailed on Feb. 6, 2019, issued in connection with U.S. Appl. No. 15/477,988, filed Apr. 3, 2017, 5 pages.
Notice of Allowance mailed on Feb. 7, 2019, issued in connection with U.S. Appl. No. 15/972,424, filed May 7, 2018, 9 pages.
Palm, Inc., "Handbook for the Palm VII Handheld," May 2000, 311 pages.
Pre-Interview First Office Action mailed on Apr. 6, 2016, issued in connection with U.S. Appl. No. 14/616,341, filed Feb. 6, 2015, 4 pages.
Preinterview First Office Action mailed on Jul. 15, 2016, issued in connection with U.S. Appl. No. 14/485,602, filed Sep. 12, 2014, 6 pages.
Preinterview First Office Action mailed on Apr. 20, 2016, issued in connection with U.S. Appl. No. 14/616,310, filed Feb. 6, 2015, 21 pages.
Preinterview First Office Action mailed on Apr. 21, 2016, issued in connection with U.S. Appl. No. 14/616,332, filed Feb. 6, 2015, 20 pages.
Pre-Interview First Office Action mailed on Feb. 23, 2016, issued in connection with U.S. Appl. No. 14/616,364, filed Feb. 6, 2015, 5 pages.
Pre-Interview First Office Action mailed on Feb. 24, 2016, issued in connection with U.S. Appl. No. 14/616,325, filed Feb. 6, 2015, 5 pages.
Pre-Interview First Office Action mailed on Mar. 29, 2016, issued in connection with U.S. Appl. No. 14/616,319, filed Feb. 6, 2015, 5 pages.
Presentations at WinHEC 2000, May 2000, 138 pages.
Seong et al. PrPl Mobile Cloud Computing and Services: Social Networks and Beyond (MCS), Jun. 15, 2010, 8 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.

| 620 | | |
|---|---|---|
| #1 | TRACK A | |
| #2 | TRACK B | |
| #3 | TRACK C | |
| #4 | TRACK F | |
| #5 | TRACK G | −612 |
| #6 | TRACK H | |
| #7 | TRACK I | |
| #8 | TRACK J | |
| #9 | TRACK K | |
| #10 | TRACK P | |
| #11 | TRACK L | |
| #12 | TRACK M | |
| #13 | TRACK N | |
| #14 | TRACK O | |
| #15 | TRACK D | |
| #16 | TRACK E | |

FIGURE 6E

| 622 | | |
|---|---|---|
| #1 | TRACK A | |
| #2 | TRACK B | |
| #3 | TRACK C | |
| #4 | TRACK F | |
| #5 | TRACK G | −612 |
| #6 | TRACK H | |
| #7 | TRACK I | |
| #8 | TRACK O | |
| #9 | TRACK K | |
| #10 | TRACK L | |
| #11 | TRACK N | |
| #12 | TRACK J | |
| #13 | TRACK M | |
| #14 | TRACK D | |
| #15 | TRACK E | |

FIGURE 6F

CONTINUOUS PLAYBACK QUEUE

CROSS REFERENCE TO RELATED APPLICATIONS

This application is a continuation of U.S. patent Ser. No. 16/995,339, filed on Aug. 17, 2020, issued as U.S. Pat. No. 11,880,553 on Jan. 23, 2024, which is a continuation of U.S. patent application Ser. No. 15/939,700, filed on Mar. 29, 2018, issued as U.S. Pat. No. 10,747,409 on Aug. 18, 2020, which is a continuation of U.S. patent application Ser. No. 14/475,093, filed on Sep. 2, 2014, which claims priority to U.S. Provisional Patent Application No. 62/027,214 filed on Jul. 21, 2014, and U.S. Provisional Patent Application No. 62/007,906 filed Jun. 4, 2014, each of which is incorporated herein in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 6E is a conceptual illustration of a playback queue after the playback device adds an item from a local source to a continuous-playback item;

FIG. 6F is a conceptual illustration of a playback queue after one or more playback-queue modifications;

Figure 1:
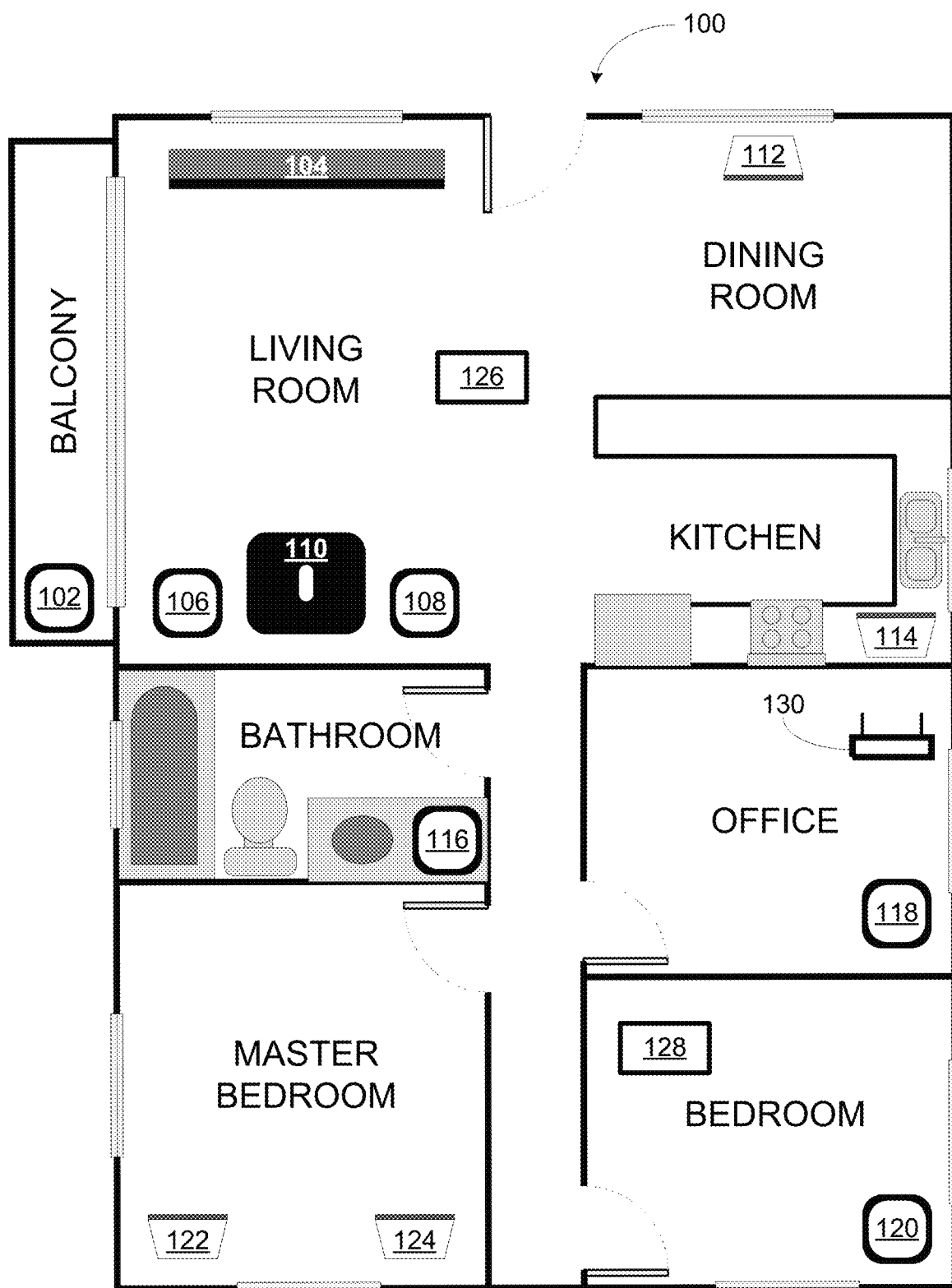
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

According to examples described herein, a media playback system may play back a playback queue according to a continuous-playback mode. Such a mode may cause the media playback system to automatically populate the playback queue with media items as the playback queue is played.

In general, media playback systems may provide options as to how play back of media occurs. One option may involve playing one media item and then playing another once a second media item is selected. Another option may involve consecutively playing multiple media items in a predetermined order. The latter option may involve the play back of a playback queue that includes the multiple media items.

Typically, a playback queue has a finite length. For example, a playback queue may include a certain number of media items. Moreover, the length of a playback queue is often dependent, at least to some extent, on user inputs. For example, a user may add media items to a playback queue using one or more inputs; the user may then add or remove media items using additional inputs.

Some media service providers control how a media playback system plays back a playback queue that includes media from the service providers. In particular, some media service providers only provide to the media playback system one media item at a time and limit playback features while the media playback system is playing the one media item. For example, some of these providers only allow the display of information about the currently playing media item, limit the number of media items that may be skipped over a certain period of time, prevent skipping to a previously played media item, and/or prevent viewing or manipulating the order of media items that the service provider intends to stream to the media playback system, among other examples.

In examples described herein, a media playback system may enter into a continuous-playback mode as the result of the addition of certain items to a playback queue. In such a continuous-playback mode, items may be automatically added to the playback queue such that play back of the playback queue continues indefinitely.

In particular, a media playback device of a media playback system (or simply "playback device") may receive a command to add one or more items to a playback queue. Such a command may come from a control device of the media playback system and may be in response to the control device detecting one or more user inputs. As used herein, an item may take the form of a single media item, a predetermined set of media items arranged in a predetermined order, or a container item that may be filled with multiple media items, among other examples.

Based on the command, the media playback device may populate the playback queue with the one or more items. The one or more items may include a continuous-playback item that may take the form of a container item that includes at least one media item. Before the media playback device populates the playback queue with the one or more items, the media playback device may have previously added items to the playback queue. Accordingly, the playback queue may include the continuous-playback item as well as other items. However, in some examples, the playback queue may only include the continuous-playback item.

In any event, the media playback device may determine that the continuous-playback item has one or more characteristics indicating that this item is indeed a continuous-playback item. For example, the one or more characteristics may indicate that a media source associated with the continuous-playback item is a continuous-playback source. Based on these characteristics, the media playback device may play back the playback queue according to a continuous-playback mode. A playback queue being played back in accordance with the continuous-playback mode may be referred to herein as a "continuous playback queue."

The media playback device may play back the continuous playback queue in a similar manner as a regular playback queue is played back. However, during play back of the continuous playback queue, the media playback device may detect a continuous-playback trigger indicating that the media playback device should add additional media items to the continuous playback queue. For example, the media playback device may determine that the currently playing media item is a predetermined number of media items away from the end of the continuous-playback item or that a predetermined percentage of the playback queue has been played. Other examples exist.

Based on the detected continuous-playback trigger, the media playback device may populate the playback queue with one or more additional media items. In particular, the media playback device may add additional media items to the continuous-playback item. Such additional media items may come from the continuous-playback source. In this way, the continuous-playback mode may help provide continuous and indefinite play back of media without requiring user inputs.

Moreover, while in the continuous-playback mode, the media playback device may perform various additional operations. For instance, in some cases, the media playback device may monitor the size of the continuous playback queue and remove items when the size exceeds a predetermined threshold. For example, the media playback device may remove one or more media items when the number of items in the continuous playback queue exceeds a predetermined threshold number of items. Other examples of such additional operations exist.

Further, the continuous playback queue may be manipulated. For example, items may be added to or removed from the continuous playback queue, the order of items in the continuous playback queue may be rearranged, and media items may be skipped or returned to, among other examples. In particular, any of these manipulations may occur to the continuous-playback item.

After entering into the continuous-playback mode, the media playback system may eventually exit the continuous-playback mode. In examples, the media playback device may play back the playback queue in accordance with the continuous-playback mode for a predetermined amount of time, for a predetermined number of media items played from the continuous-playback item, or until prompted to exit the continuous-playback mode, among other examples.

Accordingly, the examples provided herein may help to automatically add items to a playback queue. In this way, a media playback system may provide a continuous playback experience with limited user input, while also providing the option to manipulate playback in a familiar manner.

As indicated above, examples described herein involve a media playback system playing back a playback queue according to a continuous-playback mode. In one aspect, a media playback device is provided. The media playback device comprises a network interface configured to communicatively couple the media playback device to one or more networks, one or more media processing components, a non-transitory computer-readable medium, and program instructions stored on the non-transitory computer-readable medium. The program instructions are executable by at least one processor to cause the media playback device to: add one or more items to a playback queue of the media playback device, wherein the one or more items comprise a continuous-playback item comprising at least one media item, and based on one or more characteristics of the continuous-playback item, play back the playback queue according to a continuous-playback mode, wherein playing back the playback queue according to the continuous-playback mode comprises: detecting a continuous-playback trigger, and based on the detected continuous-playback trigger, adding at least one additional media item to the continuous-playback item.

In another aspect, a non-transitory computer-readable medium is provided. The non-transitory computer-readable medium having instructions stored thereon that are executable by a playback device of a media playback system to cause the playback device to: add one or more items to a playback queue of the media playback device, wherein the one or more items comprise a continuous-playback item comprising at least one media item, and based on one or more characteristics of the continuous-playback item, play back the playback queue according to a continuous-playback mode, wherein playing back the playback queue according to the continuous-playback mode comprises: detecting a continuous-playback trigger, and based on the detected continuous-playback trigger, adding at least one additional media item to the continuous-playback item.

In yet another aspect, a method is provided. The method involves: (i) adding, by a playback device of a media playback system, one or more items to a playback queue of the media playback device, wherein the one or more items comprise a continuous-playback item comprising at least one media item, (ii) based on one or more characteristics of the continuous-playback item, playing back, by the playback device, the playback queue according to a continuous-playback mode, (iii) while playing back the playback queue according to the continuous-playback mode, detecting, by the playback device, a continuous-playback trigger, and (iv) based on the detected continuous-playback trigger, adding, by the playback device, at least one additional media item to the continuous-playback item.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
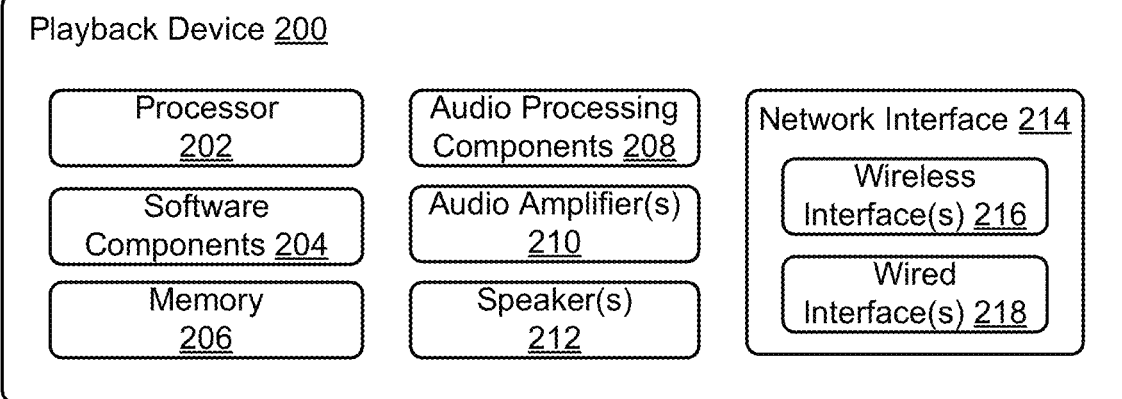
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process selection data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment. In other examples, the functions may involve the playback device 200 performing some or all of the functions discussed with respect to the methods described herein.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
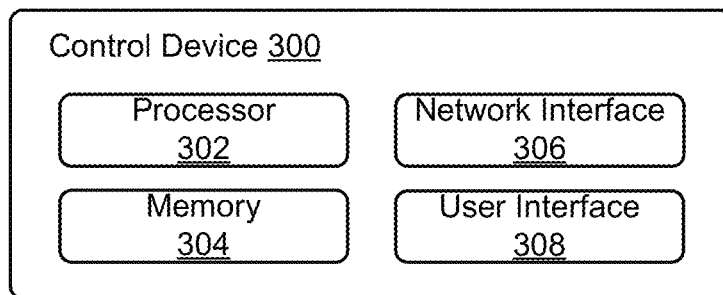
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
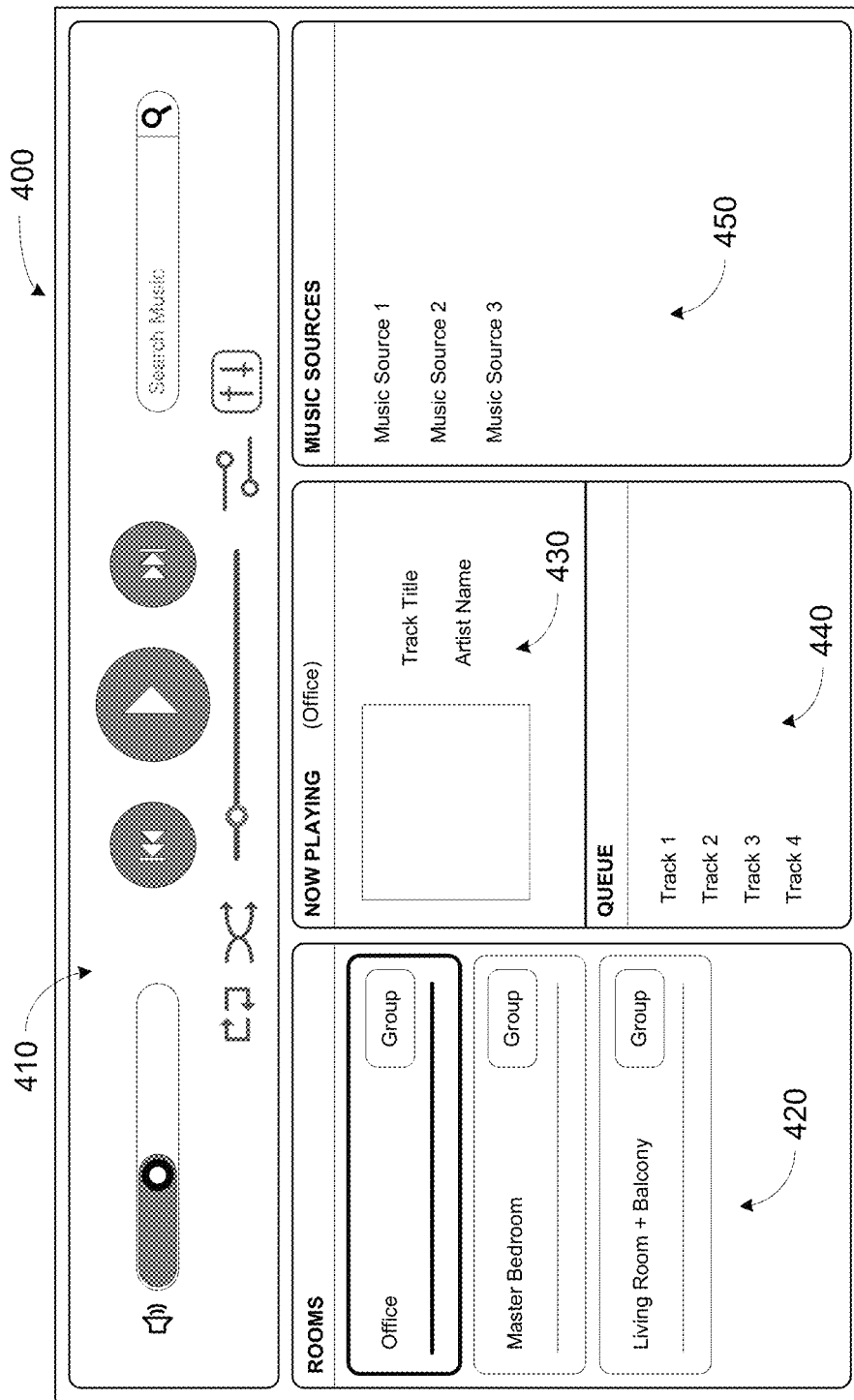
FIG. 4 shows an example controller interface.

The user interface 308 of the control device 300 may be configured to facilitate user access and control of the media playback system 100, by providing a controller interface such as the controller interface 400 shown in FIG. 4. In addition to the controller interface 400, the user interface 308 may provide another controller interface, which is discussed in greater detail below.

The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Continuous-Playback Mode

As discussed above, examples described herein may provide a media playback system configured to play back a playback queue according to a continuous-playback mode.

Figure 5:
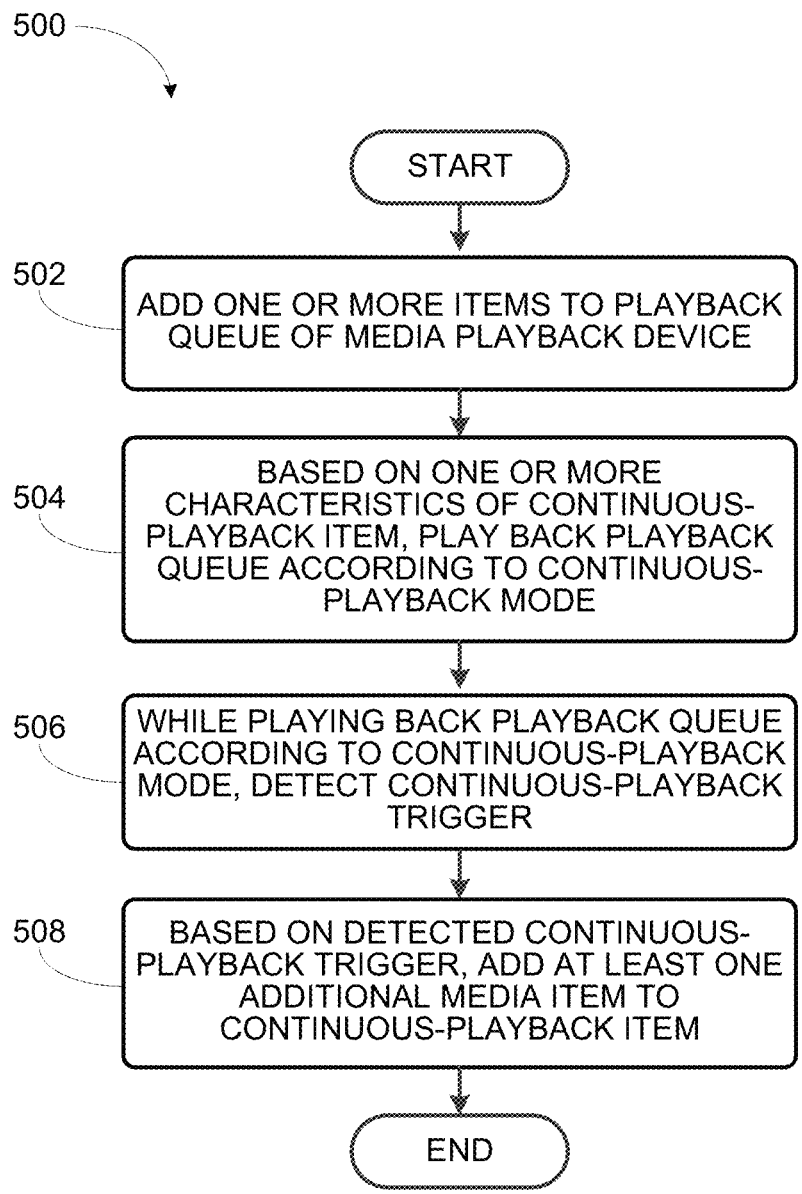
FIG. 5 shows an example flow diagram of an example method.

Method 500 shown in FIG. 5 presents an embodiment of a method that may be implemented within an operating environment involving, for example, the media playback system 100 of FIG. 1. In particular, the method 500 may be performed in whole or in part by a playback device of the media playback system 100, such as the playback device 200. The method 500 may include one or more operations or actions as illustrated by one or more of blocks 502-508. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the method 500 and other processes and methods disclosed herein, each block in FIG. 5 may represent circuitry that is wired to perform the specific logical functions in the process.

For clarity, the method 500 is described herein with reference to FIGS. 6A-6F and FIG. 7. It should be understood, however, that this is for purposes of example and explanation only and that the operations of the method 500 are not limited to these figures.

As shown in FIG. 500, the method 500 begins at block 502 with the playback device 200 adding one or more items to a playback queue of the media playback device, where the one or more items include at least a continuous-playback item. In practice, the playback device 200 may perform this operation in response to receiving a command to add the one or more items to the playback queue. For instance, a control device (e.g., the control device 300) may detect one or more user inputs indicating that the user would like to add the continuous-playback item to the playback queue (e.g., a user may select an Internet radio source from the audio content sources region 450). After detecting these one or more user inputs, the control device 300 may transmit to the playback device 200 the command to add the continuous-playback item to the playback queue. The playback device 200 may then add the continuous-playback item to the playback queue.

As discussed above, an item may take various forms. For example, an item may be a single media item, a predetermined set of media items arranged in a predetermined order, a streaming media item (e.g., Internet radio), or a container item that is fillable with other items, among other examples.

In examples, the continuous-playback item may take the form of a container item that other items may be added to or removed from. In some cases, the continuous-playback item may include one or more items when the continuous-playback item is added to the playback queue. In other cases, the continuous-playback item may be empty (or perhaps only includes particular items) when added to the playback queue and one or more items may be subsequently added to the continuous-playback item, perhaps based on the playback device 200 entering a continuous-playback mode (discussed in detail below).

Moreover, a container item may be associated with a particular media source, e.g., the particular media source provides the media items contained in the container item. For instance, the continuous-playback item may be associated with a given streaming media provider. In some cases, the continuous-playback item may include a predetermined number of media items, which may be determined by the media source associated with the container item.

In some implementations, adding the one or more items to the playback queue of the playback device may involve the playback device 200 generating a container item. In particular, the playback device 200 may receive a command to add particular media content to the playback queue, such as certain streaming media content. The playback device 200 may then generate a container corresponding to the particular media content and the container may be fillable with media from the source of the particular media content. In some cases, the container may be filled with a predetermined number of media items that the playback device 200 receives from the source. The playback device 200 may then add this generated container to the playback queue as the continuous-playback item.

In practice, how the media playback system is programmed (the playback device 200 in particular) may dictate which media content causes the playback device 200 to generate the continuous-playback item. Examples of such media content may include certain pre-programmed Internet radio and/or certain other streaming media content. In some examples, a first Internet radio source may cause the continuous-playback item to be generated, while a second Internet radio source may not. Such a distinction may depend on whether a given media source is capable of operating as a continuous-playback source, among other considerations. Other examples are also possible.

Moreover, according to examples, the playback device 200 adding the one or more items to the playback queue may involve the playback device 200 adding respective identifiers of the one or more items to the playback queue. For example, each item in the playback queue may correspond to a URI, URL, or some other identifier that may be used by the playback device 200 to locate and/or retrieve the item from a local content source or a networked content source for potential play back by the playback device 200. Similarly, for the continuous-playback item (and other container items), the playback device 200 may add respective identifiers for each item included in the continuous-playback item.

In some examples, the one or more items may be the first items added to the playback queue. Accordingly, adding the one or more items to the playback queue may involve the playback device 200 generating a new playback queue. This in turn may involve the playback device 200 allocating storage space in the memory 206 for the new playback queue. In other examples, the playback queue may already exist (e.g., already include one or more items) and the playback device 200 may add the one or more items to the existing playback queue.

Figure 6A:
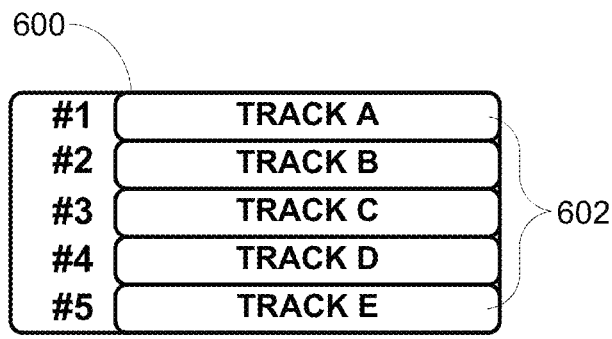
FIG. 6A is a conceptual illustration of a playback queue.

To illustrate, FIG. 6A is a conceptual illustration of a playback queue 600. The playback queue 600 may correspond to an existing playback queue that includes multiple items 602. Here, the items 602 may take the form of single media items with titles "Track A-E". Moreover, each of the items 602 may be placed in particular positions within the playback queue 600 as represented by position numbers 1-5.

Figure 6B:
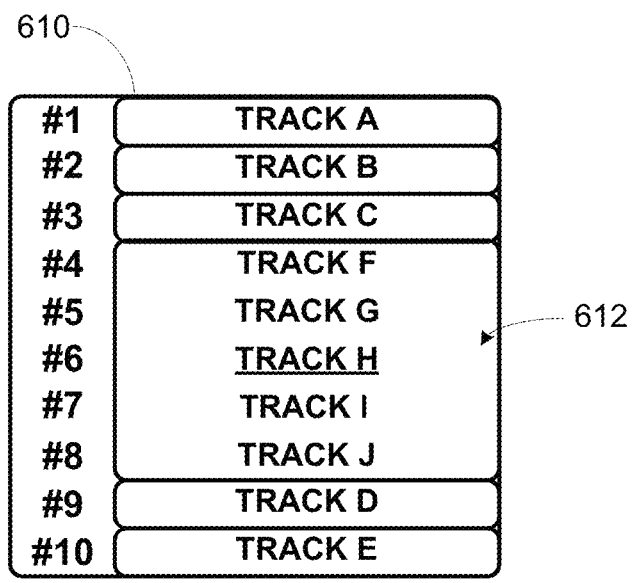
FIG. 6B is a conceptual illustration of a playback queue after a playback device adds a continuous-playback item.

FIG. 6B is a conceptual illustration of a playback queue 610 after the playback device 200 adds a continuous-playback item 612 to the playback queue 600 of FIG. 6A. As shown, the continuous-playback item 612 was added to the playback queue 600, and the continuous-playback item 612 is shown including a number of media items with titles "Track F-J". In this example, the continuous-playback item 612 was added after position number 3. Consequently, Tracks D and E are now at position numbers 9 and 10, respectively. It should be understood that the one or more items added to the playback queue may be added at any position within the playback queue.

After or perhaps before the playback device 200 adds the continuous-playback item to the playback queue, the playback device 200 may determine one or more characteristics of the continuous-playback item indicating that the item triggers or is otherwise associated with a continuous-playback mode. In practice, metadata or an indicator may indicate the one or more characteristics; either of which may be provided by the media source associated with the continuous-playback item. In some examples, the media items of the continuous-playback item may include metadata indicating the one or more characteristics. In other examples, the command to add the one or more items to the playback queue may include an indicator, such as a string of characters or the like, indicating the one or more characteristics.

In some examples, the one or more characteristics may indicate the media source associated with the continuous-playback item. In such examples, the playback device 200 may determine that the source associated with the continuous-playback item is a continuous-playback source. In particular, this operation may involve the playback device 200 determining whether the media source is included in a continuous-playback sources list that may be stored on the playback device 200 or externally. Alternatively, this operation may involve determining whether an identifier of the source matches a universal continuous-playback source identifier that may be stored by the playback device 200.

In yet other examples, the one or more characteristics may themselves trigger the continuous-playback mode. For example, the one or more characteristics may include instructions for the playback device to play back the continuous-playback item according to the continuous-playback mode. In some cases, such instructions may be provided to the playback device 200 by the control device 300 after the control device detects one or more inputs indicating that the continuous-playback item should be played according to the continuous-playback mode. For instance, a user may indicate at the control device 300 (e.g., via one or more inputs) that certain items should be added to the playback queue and that those items should be played according to the continuous-playback mode. Other examples are also possible.

Returning back to FIG. 5, at block 504, the method 500 involves, based on the one or more characteristics of the continuous-playback item, the playback device 200 playing back the playback queue according to the continuous-playback mode. It should be understood that one or more additional playback devices may also play back the playback queue according to the continuous-playback mode. Such additional playback devices may be part of a playback zone that the playback device 200 belongs to.

In examples, some "traditional" playback-queue operations, such as shuffle or repeat, may be disabled or otherwise unavailable while playing back the continuous playback queue. In yet other examples, such operations may be only temporarily disabled, if at all. In particular, in the event that the playback device 200 is playing back the playback queue in a "shuffle" mode prior to entering the continuous-playback mode, the playback device 200 may temporarily disable the shuffle mode until, for example, play back of the continuous-playback item begins. After that point in time, the shuffle mode may then be reactivated. Other examples are possible.

At block 506, the method 500 involves, while playing back the playback queue according to the continuous-playback mode, detecting a continuous-playback trigger. In general, a continuous-playback trigger may be any indication that notifies the playback device 200 to replenish the playback queue with additional items. In particular, the continuous-playback trigger may notify the playback device 200 to add items to the continuous-playback item.

In practice, the playback device 200 may detect the continuous-playback trigger before, while, or after a given item is played back. Moreover, the playback device 200 may detect the continuous-playback trigger while an item from the continuous-playback item is played back or while an item from outside of the continuous-playback item is played back.

In examples, detecting the continuous-playback trigger may involve the playback device 200 determining that play back of the playback queue is within a predetermined threshold number of items from an end of the continuous-playback item. In particular, while operating in the continuous-playback mode, the playback device 200 may monitor the remaining portion of the playback queue corresponding to items yet to be played. As more items are played from the playback queue, the remaining portion decreases, and at some point, the continuous-playback trigger is triggered.

To illustrate, returning back to FIG. 6B, the playback device 200 may play back the playback queue 610 according to the continuous-playback mode. Play back may begin with the media item in position number one (e.g., Track A) and may progress to the media item in position number two (e.g., Track B) and so forth. As play back progresses, the playback device 200 may monitor the number of items that remain before the end of the continuous-playback item 612 is reached (e.g., Track J). After some time, play back may reach the song in queue position number six (e.g. track H). At this point, the playback device 200 may determine that play back is within a threshold number of items from the end of the continuous-playback item 612. This determination may occur as Track H begins to play, while it plays, or after it ends and before Track I begins playing. In other examples, instead of determining a threshold number of items remaining, detecting the continuous-playback trigger may involve the playback device 200 detecting the start of play back of the last item in the continuous-playback item 612 (e.g., Track J).

While the above discusses the continuous-playback trigger with respect to a number of items remaining before the end of the continuous-playback item, this might not always be the case. In some examples, detecting the continuous-playback trigger may involve the playback device 200 determining that a remaining playback duration is within a predetermined threshold amount of time. In particular, while operating in the continuous-playback mode, the playback device 200 may monitor the amount of playback time that remains in the playback queue. For example, the playback device 200 may maintain a running calculation of the total time that remains of the items yet to be played. When the total time is less than a predetermined threshold amount of time, the continuous-playback trigger may be detected.

Although the above examples discuss example continuous-playback triggers with respect to a number of items or an amount of time remaining in the playback queue, one of ordinary skill in the art will appreciate that such examples are modifiable to a number of items or a predetermined percentage of the playback queue that has already been played.

In other examples, detecting the continuous-playback trigger may involve the playback device 200 determining that a predetermined time interval has elapsed. For example, the playback device 200 may be configured to monitor an internal clock of the playback device 200 and interpret the passage of every 20, 30, 60 minutes, etc. as a continuous-playback trigger. In yet other examples, detecting the continuous-playback trigger may involve the playback device 200 determining that a predetermined number of items from the playback queue (or specifically, from the continuous-playback item) have been skipped.

Other examples of detecting the continuous-playback trigger are possible. It should be understood that detecting the continuous-playback trigger may involve any combination of the aforementioned examples.

Returning back to FIG. 5, at block 508, the method 500 involves, based on the detected continuous-playback trigger, the playback device 200 adding at least one additional media item to the continuous-playback item. In practice, this operation may involve the playback device 200 transmitting to the media source associated with the continuous-playback item a request to obtain additional media items (e.g., via an API call between the playback device 200 and the media source). The media source may then provide additional media items and/or identifiers of the additional media items to the playback device 200. The playback device 200 may then populate the continuous-playback item with the additional media items.

In some examples, the request to obtain the additional media items may include information (e.g., in the form of metadata, item identifiers, or a playback queue identifier, among other examples) regarding the items already in the playback queue. Based on such information, the media source may be configured to intelligently identify items that are not yet in the playback queue. In this way, the playback device 200 may facilitate the media source providing new items for play back that are different from those items already in the playback queue.

In some examples, the playback device 200 may add a predetermined number of media items to the continuous-playback item. The predetermined number of media items may be the same as or different from the predetermined number of media items described above with reference to block 502. As discussed above, the predetermined number of media items may depend on the media source associated with the continuous-playback item.

Figures 6C, 6D:
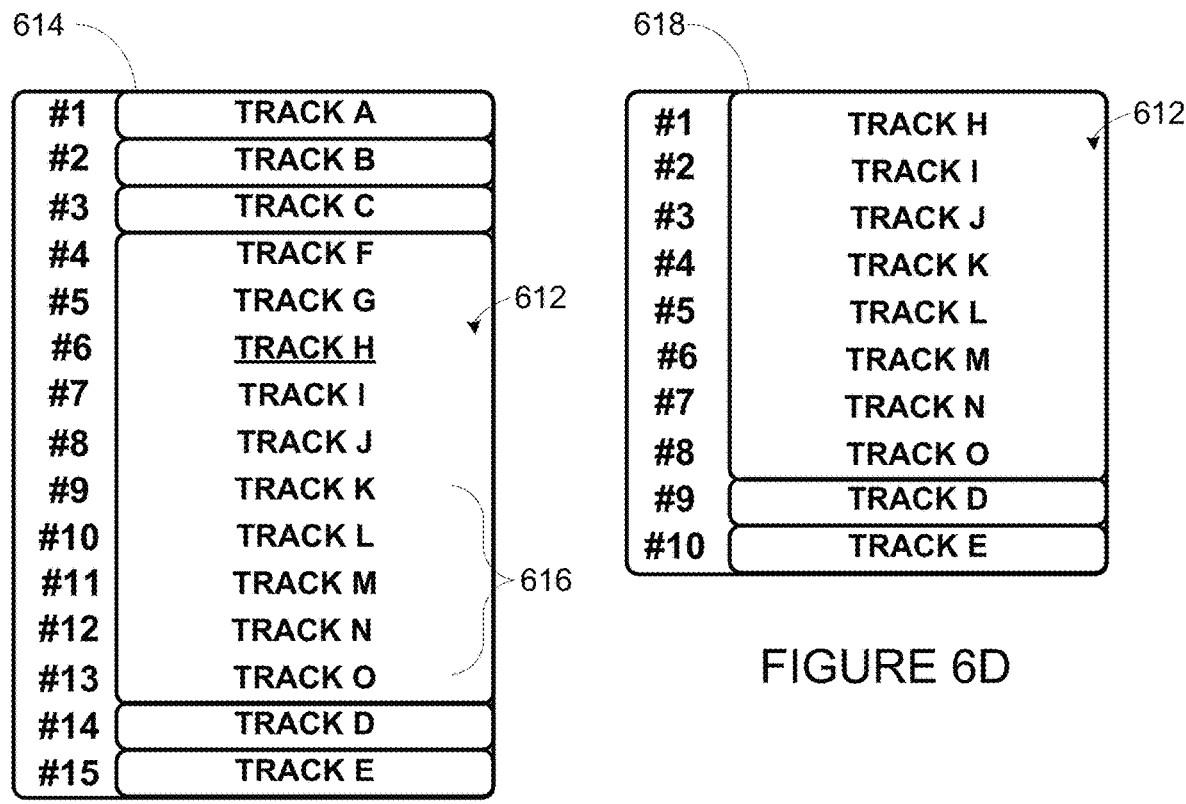
FIG. 6C is a conceptual illustration of a playback queue after a playback device adds at least one additional media item to a continuous-playback item.
FIG. 6D is a conceptual illustration of a playback queue after the playback device removes one or more media items from a playback queue.

To illustrate, FIG. 6C is a conceptual illustration of a playback queue 614 after the playback device 200 adds at least one additional media item to the continuous-playback item. The playback queue 614 may be the playback queue 610 of FIG. 6B after the playback device 200 detects the continuous-playback trigger. As shown, media items 616 (e.g., "Tracks K-O") were added to the continuous-playback item 612 after position number 8 of playback queue 610. Consequently, Tracks D and E are now at position numbers 14 and 15, respectively. Notably, the number of media items added in FIG. 6C is the same as the number of media items added in FIG. 6B. However, this should not be construed as limiting.

In some implementations, instead of adding the at least one additional media item to the existing end of the continuous-playback item, the playback device 200 may add the at least one additional media item to the end of the playback queue. For example, referring back to FIGS. 6B and 6C, the additional media items 616 may be added after Track D and E (e.g., after position number 10 of the playback queue 610) and thereby allow play back to cycle between the continuous-playback item 612 and the other items 602 in the playback queue. In this way, a user may continuously experience play back of media and may also listen to the items that he or she added to the playback queue.

Additional operations may be carried out with or in addition to the method 500. One additional operation may involve, while playing back the playback queue according to the continuous-playback mode, the playback device 200 removing items from the playback queue. In examples, this operation may involve the playback device 200 monitoring a queue size that corresponds to a size of the continuous playback queue. The queue size may be a number of items currently in the playback queue or a storage measurement indicating an amount of storage space occupied by the playback queue.

At some point in time, the playback device 200 may determine that the queue size exceeds a predetermined threshold size. In practice, the playback device 200 may make such a determination after the playback device 200 adds items to the playback queue (e.g., after block 508). For example, returning to FIG. 6C, the playback device 200 may determine that the queue size of the playback queue 614 exceeds a predetermined threshold number of items (e.g., 10 media items).

Based on determining that the queue size exceeds the predetermined threshold size, the playback device 200 may remove one or more items from the playback queue. To illustrate, FIG. 6D is a conceptual illustration of a playback queue 618 after the playback device 200 removes one or more media items from the playback queue 614. As shown, the remaining media items are now at different position numbers than in the playback queue 614.

In examples, before the playback device 200 removes the one or more items from the playback queue, the playback device 200 may determine which items to remove. In some implementations, the removed items may correspond to the items that have been in playback queue the longest or the items that were played back the longest time ago. Accordingly, each item may include a timestamp that indicates a time that the given item was added to the playback queue and/or a time that the given item was played back. A timestamp may identify a clock time or a time-since-power-on, among other examples. For items that have yet to be played back, a playback timestamp may be set to null or the like.

In some implementations, determining which items to remove from the playback queue may involve the playback device 200 analyzing user playback preferences. In one example, items from the playback queue that were skipped by the user may be removed first. In another example, items from the playback queue that were starred, flagged, or otherwise identified as items that the user enjoyed experiencing may not be removed from the playback queue regardless of their respective timestamp values.

In some implementations, the above operations may be particular to the continuous-playback item. For example, instead of the playback device 200 monitoring a queue size, the playback device 200 may monitor a size of the continuous-playback item. And instead of the playback device 200 removing items from the playback queue, the playback device 200 may remove one or more items from the continuous-playback item. For instance, returning to FIGS. 6C and 6D, instead of removing Tracks A, B, C, F, and G from the playback queue 614, the playback device 200 may remove Tracks F, G, H, I, and J from the continuous-playback item 612 (assuming of course that play back is at or after Track K).

It should be understood that the above operations discussed with reference to blocks 506 and 508 may continue to occur while the playback device 200 operates in the continuous-playback mode. In this way, the methods, systems, and devices described herein may help provide a user a continuous media playback experience with little to no user interaction with the media playback system.

In some examples, playing back the continuous playback queue may be similar in some respects to playing back a regular playback queue. Accordingly, operations that may be carried out with or in addition to the method 500 may involve some operations that may be carried out while playing back a normal playback queue. In particular, these operations may be performed to the continuous-playback item.

For instance, items may be added to a continuous playback queue and may be even added to continuous-playback item. For example, an album of media items, media items identified by a playlist, a streaming media source, etc. may be added to the playback queue. Moreover, the added items may be from the same source or a different source than that which is associated with the continuous-playback item. To illustrate, FIG. 6E is a conceptual illustration of a playback queue 620 after the playback device 200 adds an item from a local source to the continuous-playback item 612. The playback queue 620 may be the playback queue 614 of FIG. 6C sometime after the playback device 200 begins playing Track I. As shown, a single media item, "Track P", was added to the continuous-playback item 612 (and thus the playback queue 620). It should be understood that "Track P" could have been a playlist, an album, etc.

Moreover, the items of the continuous playback queue may be manipulated as though the continuous playback queue were a normal playback queue. In particular, example traditional operations that may be performed may include: re-ordering the playback order of the items in the playback queue, skipping items, returning to a previously played item, jumping to a particular position number, and seeking forward or backward within a given item. To illustrate, FIG. 6F is a conceptual illustration of a playback queue 622 after one or more playback-queue modifications. The playback queue 622 may be the playback queue 614 of FIG. 6C after the playback device 200 performs multiple modification operations. In particular, as shown, Tracks J, M, N, and O have been re-ordered within the continuous-playback item 612.

Further, the continuous playback queue may also be saved by the playback device 200 as a playlist for future playback. In particular, the playback device 200 may save the continuous playback queue at any point in time and/or may save multiple version of the continuous playback queue as it grows. For example, after a first addition of items to the playback queue, a first playlist may be saved, and after a tenth addition of items to the playback queue, a second playlist may be saved. It should be understood that these are but a few possible traditional operations that may be carried out with a continuous playback queue and should not be construed as limiting. Other operations are possible.

In example implementations, any of these operations may be performed by the playback device 200 in response to receiving one or more playback-queue-modification commands. In some cases, a user may use a controller interface on a control device to manipulate a continuous-playback queue. The control device may then send playback-queue-modification commands to the playback device 200. The playback device 200 may then modify the playback queue based on the received commands.

Another operation that may be carried out with or in addition to the method 500 may involve the playback device 200 transmitting playback-queue-state data indicating an addition of more items or a modification to the playback queue. Such data may be transmitted after items are added to the playback queue or after the playback device 200 modifies the playback queue. Playback-queue-state data may be transmitted to a control device (e.g., the control device 300) or the media source associated with the continuous-playback item, among other possibilities. In some cases, the control device (or perhaps another device) may use such data to cause a graphical display to display the current state of the playback queue.

In examples, after adding a media item to the continuous-playback item (e.g., after block 508 or in response to a playback-queue-modification command), the playback device 200 may transmit playback-queue-state data indicating the addition of the media item. The playback-queue-state data may include an indication of where in the queue the media item was added. For example, returning back to FIGS. 6C and 6E, the playback device 200 may transmit playback-queue-state data after adding Track P. Such data may indicate that Track P was added to the playback queue 614 at position number 10. In some implementations, the playback-queue-state data may also indicate that Track P was added between Tracks K and L (and perhaps their previous position numbers) and that the position numbers for all items after Track K have been incremented by one. Moreover, the playback-queue-state data may include a media item identifier corresponding to Track P.

In examples where the added media item is from a source different from the source associated with the continuous-media item, the playback-queue-state data may also include metadata of the added media item. The metadata of the added media item may indicate a media item identifier that may be used to facilitate cross-service linking, a title, an artist name, an album name, and/or a media item length (e.g., duration of time), among other examples.

In some examples, after modifying the playback queue, the playback device 200 may transmit playback-queue-state data indicating a modification location. The modification location may indicate one or more playback-queue positions corresponding to the modification to the playback queue. For example, the playback-queue-state data may include past and/or present position numbers for items affected by the modification. Returning to FIG. 6F, after the playback device 200 modifies the playback queue 622, the playback device 220 may transmit playback-queue-state data indicating that Track O was at position number 13 but is now at position number 8, that Track N was at position number 12 and is now at position number 11, and so forth.

In addition to transmitting playback-queue-state data, the playback device 200 may also transmit mode-indicator data. In examples, such data may be transmitted to a control device (e.g., the control device 300). This operation may occur after the playback device 200 enters into the continuous-playback mode (e.g., after block 504). The mode-indicator data may facilitate causing a graphical display (e.g., of the control device 300) to display an indication that the playback device 200 is operating in the continuous-playback mode.

Figure 7:
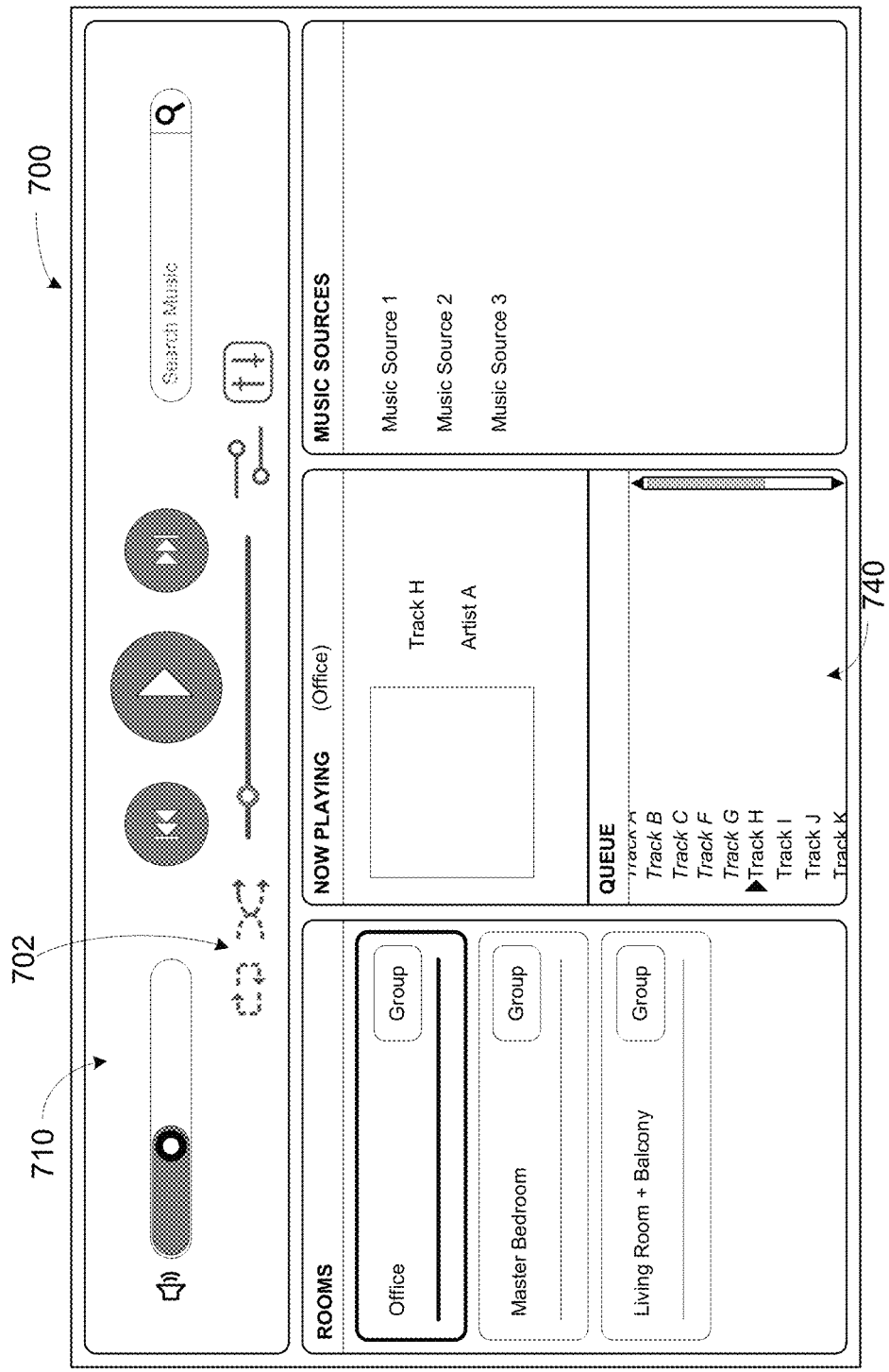
FIG. 7 shows an example controller interface after a control device receives mode-indicator data and FIG. 8 shows an example flow diagram of an example method.

To illustrate, FIG. 7 shows an example controller interface 700 after the control device 300 receives mode-indicator data. In some respects, the controller interface 700 is similar to the controller interface 400. However, control icons 702 corresponding to a repeat control and a shuffle control are shown as disabled (e.g., as indicated by the dashed lines). Such an indication may represent an implicit indication that the playback device 200 is operating in the continuous-playback mode.

Moreover, the controller interface 700 also depicts an example representation of a continuous playback queue in playback queue region 740. The illustrated playback queue may correspond to the playback queue 614 of FIG. 6C. As shown, the playback queue region 740 includes a listing of the items in the playback queue, as well as an indicator of the item currently playing (here, Track H) and an indication of previously played items (here, italicized track titles). Other example representations of a continuous playback queue are also possible.

Another example of an implicit indication may involve displaying a portion of the items in the continuous playback queue with a color gradient indicating additional items will be added. For example, a color gradient may be applied to one or more of the last items displayed in the playback queue region 740. In other examples, the controller interface 700 may display an explicit indication that the playback device 200 is operating in the continuous-playback mode, perhaps in playback control region 710 or one of the other regions.

In some implementations, the playback device 200 may only play back a portion of a playback queue according to the continuous-playback mode. In particular, the playback device 200 may only play back the continuous-playback item according to the continuous-playback mode and any other items in the playback queue may be played back according to normal play back. In other implementations, adding the continuous-playback item to a playback queue may cause any other items in the playback queue to be played according to the continuous-playback mode, while the continuous-playback item is played back according to normal play back.

After the playback device 200 beings playing back the playback queue according to the continuous-playback mode, the playback device 200 may eventually cease playing back the playback queue according to the continuous-playback mode. That is, the playback device 200 may exit the continuous-playback mode.

In practice, the playback device 200 may cease playing back the playback queue according to the continuous-playback mode based on detecting an exit-mode trigger. In one example, the playback device 200 detecting the exit-mode trigger may involve receiving a stop message. In such an example, the control device 300 may detect an input indicating an instruction to exit the continuous-playback mode. The control device 300 may then transmit to the playback device 200 the stop message indicating a command for the playback device 200 to cease playing back the playback queue. Similarly, the playback device 200 detecting the exit-mode trigger may involve receiving a replace-queue message indicating that different media content should replace the currently playing continuous-playback mode.

In another example, the exit-mode trigger may take the form of on an amount of time, or perhaps a number of played items, while in the continuous-playback mode. In particular, the playback device 200 detecting such an exit-mode trigger may involve the playback device 200 monitoring a duration of time during which the playback device 200 plays back the playback queue according to the continuous-playback mode (or perhaps a number of items played while in the continuous-playback mode). Moreover, this operation may involve the playback device 200 determining that the duration of time (or number of items) exceeds a predetermined threshold duration of time (or threshold number of items).

In another example, the exit-mode trigger may take the form of a predetermined threshold size of the playback queue and/or the continuous-playback queue. In some examples, the predetermined threshold size may include a predetermined number of items or a predetermined amount of storage space. In any event, detecting the exit-mode trigger may involve the playback device 200 monitoring the size of the playback queue and determining that the size exceeds the predetermined threshold size. Similarly, in other examples, detecting the exit-mode trigger may involve the playback device 200 determining that the number of items added to the playback queue (or specifically, to the continuous-playback queue) exceeds a predetermined threshold number. In the above examples that involve thresholds, such thresholds may have been set by the playback device 200, a user of the playback device 200, or the source associated with the continuous-playback item, among other examples.

Based on the playback device 200 detecting the exit-mode trigger, the playback device 200 may cease playing back the playback queue according to the continuous-playback mode. In examples, after exiting the continuous-playback mode, the playback device 200 may play back the remaining items in the playback queue that have not been played.

Figure 8:
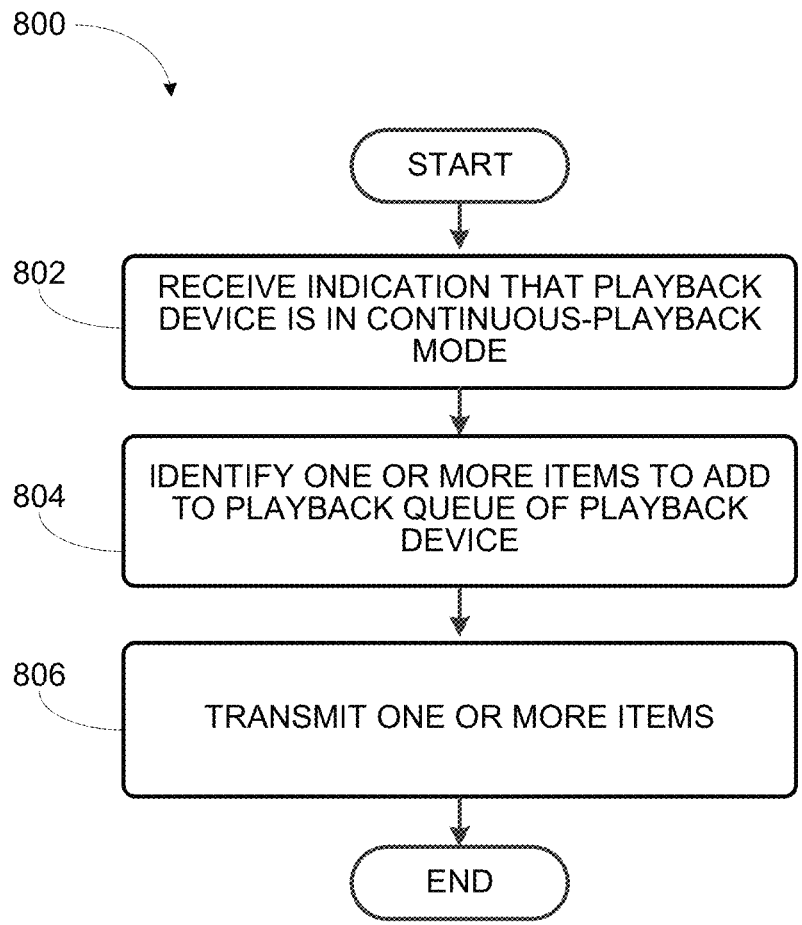

As noted above, a media source may provide the playback device 200 additional media items while the playback device 200 is playing back the playback queue according to the continuous-playback mode. FIG. 8 shows an example flowchart of a method 800 that may be performed by a media source server (or simply "media source"). The method 800 may be implemented within a cloud network that includes a media playback system communicatively coupled to a media source server via the cloud network. In particular, the method 800 may be performed in whole or in part by a media source server. The method 800 may include one or more operations or actions as illustrated by one or more of blocks 802-806.

At block 802, the method 800 involves the media source receiving an indication that a playback device is in a continuous-playback mode. In practice, the media source may receive the indication from a playback device (e.g., the playback device 200) or a control device (e.g., the playback device 300) that is communicatively coupled to the media source, among other devices. The indication may be particular to and/or identify a given playback device (e.g., the playback device 200) or perhaps a particular media playback system. The received indication may take various forms.

In one example, the indication may be included in a request for additional media items. For instance, in line with the above discussion, the playback device 200 may send to the media source a request for additional media items (e.g., an API call). The request may include an indicator indicating that the playback device 200 is operating in a continuous-playback mode. In other examples, the indication may be independent from any request for additional media items. For instance, after entering the continuous-playback mode, the playback device 200 may transmit to the media source a mode-indication message that includes the indication. The indication may take other forms as well.

At block 804, the method 800 involves the media source identifying one or more items to add to a playback queue of the playback device. In practice, in some cases, the media source may perform this operation based on receiving the indication and a request to add additional media items. For example, based on receiving the indication, the media source may enter a mode during which the media source awaits a request for additional media items. After receiving such a request, the media source may then identify the one or more items to add to the playback queue. In other cases, the media source may automatically perform this operation based on receiving the indication. For example, based on receiving the indication, the media source may enter a mode during which the media source automatically identifies a predetermined number of items to add to the playback queue. The media source may do so based on a predetermined time interval, such as every 20, 30, or 60 minutes of playback by the playback device 200 while in the continuous-playback mode. Other examples are also possible.

Moreover, the media source identifying the one or more items to add to the playback queue of the playback device 200 may involve the media source determining the items already in the playback queue (e.g., both items that have and have not yet been played). In some examples, this operation may involve the media source maintaining a profile for the playback device 200 that includes respective indicators for each of the items in the playback queue. In other examples, the received request to obtain the additional media items may include information (e.g., in the form of metadata, item identifiers, or a playback queue identifier, among other examples) regarding the items already in the playback queue. In any event, based on the items already in the playback queue, the media source may be configured to intelligently identify items that are not yet in the playback queue. In this way, the playback device 200 may facilitate the media source providing new items for play back that are different from those items already in the playback queue.

In other cases, the media source identifying the one or more items to add to the playback queue may involve the media source performing one or more item-selection algorithms that may be unique to the given media source. Such algorithms may allow the media source to identify items that suit the preferences of a user of the playback device 200. In yet other cases, the media source identifying the one or more items to add to the playback queue may involve the media source randomly selecting one or more items from a media source library. Other examples are also possible.

At block 806, the method 800 involves the media source transmitting one or more items. For example, the media source may transmit the one or more items to the playback device 200 via the cloud network. In some examples, transmitting the one or more items may involve the media source transmitting respective identifiers of the one or more items or perhaps the one or more items themselves. One of ordinary skill in the art will appreciate that the media source may perform other operations to facilitate the continuous-playback mode and that the above discussion should not be construed as limiting.

While some examples described herein may refer to operations performed by given actors, such as "users" and/or other entities, it should be understood that this is for purposes of explanation only. The claims should not be interpreted to require action by any such actors unless explicitly required by the language of the claims themselves.

IV. Example Cloud Queue

In various examples, a playback queue may exist, that is, be implemented in, the cloud. Such queues may be referred to herein as cloud queues. A playback device may synchronize to a cloud queue and use it as a source of audio tracks to be played. In this manner, a cloud queue may replace a queue data structure stored in a playback device.

Cloud queues may utilize one or more protocols or application programming interfaces. For instance, a cloud queue sync protocol (or API) may provide an application-level network protocol (or set of methods and events) used by a playback device to maintain synchronization with a cloud queue. This protocol, referred to herein as a "Cloud-Queue Sync Protocol," may allow quick updates when changes are made to the cloud queue. As another example, controllers may utilize a CloudQueue API which provides a set of application-level network protocols used to browse, edit, and control playback of a cloud queue.

Moving the playback queue to the cloud has several possible advantages. For instance, a cloud queue may allow control of a playback device from a device that is not on the same local area network as the playback device. Further, implementation of a cloud queue may avoid memory limitations of the playback device such that the number of tracks in the cloud queue can greatly exceed the number of tracks that a playback device could store locally in memory. In addition to unlimited tracks in the cloud queue, the cloud can also store more metadata for each audio track in the cloud queue.

The CloudQueue Sync Protocol may also support programmed radio as though it were a virtual playlist. This virtual playlist can be programmatically updated as it plays. For instance, new tracks can be appended as needed, and the list could be "steered" using any algorithm that a cloud service implements.

A cloud service may host the cloud queue. The cloud service may be a media playback system cloud service. Alternatively, the cloud service may be a streaming audio service. For instance, a streaming audio service may host a web service that exposes the CloudQueue sync protocol, which would allow the service to expose dynamic playlists that could be played directly by playback devices.

In some examples, audio content continues to play from a cloud queue for at least a given period of time (e.g., 8 hours) if the user does not interrupt playback and there is sufficient content in the queue for playback to continue for that period of time. An authorization token for a cloud queue might not expire (or may renew automatically) while the audio plays or if the audio is paused for less than a certain amount of time. However, if music is paused for more than a certain amount of time, then playback cannot be resumed.

The cloud queue is mutable (i.e., editable). Another application, like a third-party (partner) application, may sync its queue to the cloud queue. Alternatively, it can completely replace the queue in a third-party application.

As noted above, playback devices need not fit the entire cloud queue into memory. Instead, a playback device may fetch and cache a portion of the cloud queue at any given time. This allows for queues to have (theoretically) unlimited size.

To create a cloud queue, a client application may call an API to create a cloud queue and populate the cloud queue with one or more media items. The hosting server(s) may respond to the API calls to create the cloud queue with a globally unique URI that represents the cloud queue. This may be a similar process whether the hosting cloud service is a media playback system cloud service or a streaming audio service.

The service hosting the cloud queue may implement a playhead. The playhead represents a position within the cloud queue (i.e., current audio track plus a time offset within the track). A service may implement multiple playheads corresponding to each playback device (or group of playback devices) that is playing the cloud queue. The playheads may be independent, or the cloud may synchronize changes between them (e.g., so that skipping ahead on one player would cause other players to also skip ahead). The client app may call an API to create a playhead for a new cloud queue, which returns a URI to the playhead.

In some examples, a playlist may be played by reference using a cloud queue. When a playlist is played by reference, edits to the playlist while the playlist is being played will immediately affect the cloud queue. Playback of a playlist by reference may be implemented with a wrapper or adapter around a playlist which is already stored in the cloud. Alternatively, a cloud queue could be instantiated that makes a copy of the playlist, but also subscribes to be notified of changes to the playlist. Using the playlist change notifications, the cloud queue is kept in sync with the playlist.

Using the URI to the cloud queue (or playhead), a playback device may play back the cloud queue. In an example, the playback device fetches a window of tracks from the cloud queue and stores (caches) the window locally. In some examples, the window is at least two tracks to facilitate gapless playback. Then, the player starts streaming the first audio track in the window and starts playing that track.

The cloud service may keep the window at the playback device in sync with the cloud queue using the CloudQueue sync protocol. Under this protocol, the playback device requests a window starting with (or centered around) the playhead (i.e., currently playing audio track). At the start of playback, the playback device requests a window centered around the playhead. If changes are made to the cloud queue, the cloud service may send a refresh window event to the playback device, which causes the playback device to request a new window centered around the current location of the playhead.

When the playback device advances to the last track (or possibly a track or two before the last track), it may fetch the next window of tracks form the cloud queue and cache it locally (e.g., if it believes there are more tracks in the cloud queue). Each time the playback device advances to the next track (or jumps to a different track), if the playback device is connected to a playhead in the cloud, the playback device sends an event to the playhead to indicate that the previous track that just finished playing and the new track that has started playing. This event may also indicate the position within the previous track to indicate whether the previous track was played through to the end.

When the playback device reaches the end of the cloud queue, the cloud service may add one or more additional tracks to extend playback. In some cases, the cloud service may add a container. Further examples are described in section III above.

Similar to a local queue, a cloud queue may support standard transport control commands. With a cloud queue, such transport control commands may be sent to a playback device directly or through the cloud. Example transport control commands include play/pause, next track (and previous track), seek to track, scrub (i.e., seek to a time position within a track), as well as set source. A cloud queue may also support various playback modes, such as shuffle, repeat, crossfade, and the like.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, examples described herein involve a media playback system playing back a playback queue according to a continuous-playback mode. In one aspect, a media playback device is provided. The media playback device comprises a network interface configured to communicatively couple the media playback device to one or more networks, one or more media processing components, a non-transitory computer-readable medium, and program instructions stored on the non-transitory computer-readable medium. The program instructions are executable by at least one processor to cause the media playback device to: add one or more items to a playback queue of the media playback device, wherein the one or more items comprise a continuous-playback item comprising at least one media item, and based on one or more characteristics of the continuous-playback item, play back the playback queue according to a continuous-playback mode, wherein playing back the playback queue according to the continuous-playback mode comprises: detecting a continuous-playback trigger, and based on the detected continuous-playback trigger, adding at least one additional media item to the continuous-playback item.

In another aspect, a non-transitory computer-readable medium is provided. The non-transitory computer-readable medium having instructions stored thereon that are executable by a playback device of a media playback system to cause the playback device to: add one or more items to a playback queue of the media playback device, wherein the one or more items comprise a continuous-playback item comprising at least one media item, and based on one or more characteristics of the continuous-playback item, play back the playback queue according to a continuous-playback mode, wherein playing back the playback queue according to the continuous-playback mode comprises: detecting a continuous-playback trigger, and based on the detected continuous-playback trigger, adding at least one additional media item to the continuous-playback item.

In yet another aspect, a method is provided. The method involves: (i) adding, by a playback device of a media playback system, one or more items to a playback queue of the media playback device, wherein the one or more items comprise a continuous-playback item comprising at least one media item, (ii) based on one or more characteristics of the continuous-playback item, playing back, by the playback device, the playback queue according to a continuous-playback mode, (iii) while playing back the playback queue according to the continuous-playback mode, detecting, by the playback device, a continuous-playback trigger, and (iv) based on the detected continuous-playback trigger, adding, by the playback device, at least one additional media item to the continuous-playback item.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A cloud computing system comprising a network interface, at least one processor, and at least one non-transitory computer-readable medium including program instructions that are executable by the at least one processor such that the cloud computing system is configured to:
receive, via the network interface from a computing device configured to control playback by a media playback device, data representing an instruction to add a playlist to a playback queue associated with the media playback device, wherein the playlist comprises a first audio track and a second audio track, and wherein the playback queue is maintained in data storage that is remote from the media playback device;
after receipt of the data representing the instruction, add the playlist to the playback queue, wherein after addition of the playlist to the playback queue, the playback queue comprises the first audio track and the second audio track arranged in a particular order within the playback queue;
cause the media playback device to play back the playback queue according to a continuous-playback mode;
while the media playback device is playing back the playback queue according to the continuous-playback mode via one or more speakers, repeatedly detect a continuous-playback trigger, wherein the program instructions that are executable by the at least one processor such that the cloud computing system is configured to detect the continuous-playback trigger comprise program instructions that are executable by the at least one processor such that the cloud computing system is configured to determine that a number of unplayed audio tracks within the playback queue is less than a predetermined threshold number of audio tracks, and wherein detection of the continuous-playback trigger is independent of user input; and
in response to detection of each continuous-playback trigger:
(i) determine one or more additional audio tracks that are related to at least one audio track of the playback queue; and
(ii) add the one or more additional audio tracks to the playback queue.

2. The cloud computing system of claim 1, wherein the program instructions that are executable by the at least one processor such that the cloud computing system is configured to cause the media playback device to play back the playback queue according to the continuous-playback mode comprise program instructions that are executable by the at least one processor such that the cloud computing system is configured to send, via the network interface to the media playback device, data representing a window of audio tracks from the playback queue, the window comprising a currently playing audio track.

3. The cloud computing system of claim 2, wherein the program instructions that are executable by the at least one processor such that the cloud computing system is configured to cause the media playback device to play back the playback queue according to the continuous-playback mode comprise program instructions that are executable by the at least one processor such that the cloud computing system is configured to:
send data representing instructions to queue the audio tracks of the window in a local queue in data storage on the media playback device.

4. The cloud computing system of claim 1, wherein the program instructions that are executable by the at least one processor such that the cloud computing system is configured to determine the one or more additional audio tracks that are related to at least one audio track of the playback queue comprise program instructions that are executable by the at least one processor such that the cloud computing system is configured to;
determine an Internet radio station seeded based on at least one audio track of the playback queue, and wherein the program instructions that are executable by the at least one processor such that the cloud computing system is configured to add the one or more additional audio tracks to the playback queue comprise program instructions that are executable by the at least one processor such that the cloud computing system is configured to add the Internet radio station to the playback queue.

5. The cloud computing system of claim 1, wherein the program instructions that are executable by the at least one processor such that the cloud computing system is configured to receive the data representing the instruction to add the playlist to the playback queue associated with the media playback device comprise program instructions that are executable by the at least one processor such that the cloud computing system is configured to:
receive data representing an instruction to select the first audio track of the playlist for playback.

6. The cloud computing system of claim 1, wherein the cloud computing system comprises a streaming audio service, and wherein the program instructions that are executable by the at least one processor such that the cloud computing system is configured to cause the media playback device to play back the playback queue according to the continuous-playback mode comprise program instructions that are executable by the at least one processor such that the cloud computing system is configured to:
stream data representing audio tracks of the playback queue to the media playback device.

7. The cloud computing system of claim 1, wherein the program instructions are executable by the at least one processor such that the cloud computing system is further configured to:

receive, via the network interface from the computing device, data representing instructions to configure the playback queue in the continuous-playback mode; and in response to receiving the data representing instructions to configure the playback queue in the continuous-playback mode, transition from a non-continuous-playback mode to the continuous-playback mode, wherein the cloud computing system is configured to stop playback of the playback queue after the media playback device plays back the audio track queued last in the playback queue when in the non-continuous-playback mode.

8. The cloud computing system of claim 1, wherein the program instructions are executable by the at least one processor such that the cloud computing system is further configured to:

monitor a duration of time while playing back the playback queue according to the continuous-playback mode; and in response to determining that the duration of time exceeds a predetermined threshold duration of time, cause the media playback device to cease playing back the playback queue according to the continuous-playback mode.

9. The cloud computing system of claim 1, wherein the predetermined threshold number of audio tracks is zero.

10. The cloud computing system of claim 1, wherein an album comprises the first audio track and the second audio track, and wherein the playlist further comprises one or more third audio tracks of the album.

11. At least one non-transitory computer-readable medium comprising program instructions that are executable by at least one processor such that a cloud computing system is configured to:

receive, via a network interface from a mobile device configured to control playback by a media playback device, data representing an instruction to add a playlist to a playback queue associated with the media playback device, wherein the playlist comprises a first audio track and a second audio track, and wherein the playback queue is maintained in data storage that is remote from the media playback device;

after receipt of the data representing the instruction, add the playlist to the playback queue, wherein after addition of the playlist to the playback queue, the playback queue comprises the first audio track and the second audio track arranged in a particular order within the playback queue;

cause the media playback device to play back the playback queue according to a continuous-playback mode;

while the media playback device is playing back the playback queue according to the continuous-playback mode via one or more speakers, repeatedly detect a continuous-playback trigger, wherein the program instructions that are executable by the at least one processor such that the cloud computing system is configured to detect the continuous-playback trigger comprise program instructions that are executable by the at least one processor such that the cloud computing system is configured to determine that a number of unplayed audio tracks within the playback queue is less than a predetermined threshold number of audio tracks, and wherein detection of the continuous-playback trigger is independent of user input; and in response to detection of each continuous-playback trigger:

(i) determine one or more additional audio tracks that are related to at least one audio track of the playback queue; and (ii) add the one or more additional audio tracks to the playback queue.

12. The at least one non-transitory computer-readable medium of claim 11, wherein the program instructions that are executable by the at least one processor such that the cloud computing system is configured to cause the media playback device to play back the playback queue according to the continuous-playback mode comprise program instructions that are executable by the at least one processor such that the cloud computing system is configured to send, via the network interface to the media playback device, data representing a window of audio tracks from the playback queue, the window comprising a currently playing audio track.

13. The at least one non-transitory computer-readable medium of claim 12, wherein the program instructions that are executable by the at least one processor such that the cloud computing system is configured to cause the media playback device to play back the playback queue according to the continuous-playback mode comprise program instructions that are executable by the at least one processor such that the cloud computing system is configured to:

send data representing instructions to queue the audio tracks of the window in a local queue in data storage on the media playback device.

14. The at least one non-transitory computer-readable medium of claim 11, wherein the program instructions that are executable by the at least one processor such that the cloud computing system is configured to determine the one or more additional audio tracks that are related to at least one audio track of the playback queue comprise program instructions that are executable by the at least one processor such that the cloud computing system is configured to:

determine an Internet radio station seeded based on at least one audio track of the playback queue, and wherein the program instructions that are executable by the at least one processor such that the cloud computing system is configured to add the one or more additional audio tracks to the playback queue comprise program instructions that are executable by the at least one processor such that the cloud computing system is configured to add the Internet radio station to the playback queue.

15. The at least one non-transitory computer-readable medium of claim 11, wherein the program instructions that are executable by the at least one processor such that the cloud computing system is configured to receive the data representing the instruction to add the playlist to the playback queue associated with the media playback device comprise program instructions that are executable by the at least one processor such that the cloud computing system is configured to:

receive data representing an instruction to select the first audio track of the playlist for playback.

16. The at least one non-transitory computer-readable medium of claim 11, wherein the cloud computing system comprises a streaming audio service, and wherein the program instructions that are executable by the at least one processor such that the cloud computing system is configured to cause the media playback device to play back the playback queue according to the continuous-playback mode comprise program instructions that are executable by the at least one processor such that the cloud computing system is configured to:

stream data representing audio tracks of the playback queue to the media playback device.

17. The at least one non-transitory computer-readable medium of claim 11, wherein the program instructions are executable by the at least one processor such that the cloud computing system is further configured to:
receive, via the network interface from the mobile device, data representing instructions to configure the playback queue in the continuous-playback mode; and
in response to receiving the data representing instructions to configure the playback queue in the continuous-playback mode, transition from a non-continuous-playback mode to the continuous-playback mode, wherein the cloud computing system is configured to stop playback of the playback queue after the media playback device plays back the audio track queued last in the playback queue when in the non-continuous-playback mode.

18. The at least one non-transitory computer-readable medium of claim 11, wherein the program instructions are executable by the at least one processor such that the cloud computing system is further configured to:
monitor a duration of time while playing back the playback queue according to the continuous-playback mode; and
in response to determining that the duration of time exceeds a predetermined threshold duration of time, cause the media playback device to cease playing back the playback queue according to the continuous-playback mode.

19. The at least one non-transitory computer-readable medium of claim 11, wherein the predetermined threshold number of audio tracks is zero.

20. A method comprising:
receiving, via a network interface from a mobile device configured to control playback by a media playback device, data representing an instruction to add a playlist to a playback queue associated with the media playback device, wherein the playlist comprises a first audio track and a second audio track, and wherein the playback queue is maintained in data storage that is remote from the media playback device;
after receiving the data representing the instruction, adding the playlist to the playback queue, wherein after adding the playlist to the playback queue, the playback queue comprises the first audio track and the second audio track arranged in a particular order within the playback queue;
causing the media playback device to play back the playback queue according to a continuous-playback mode;
while the media playback device is playing back the playback queue according to the continuous-playback mode via one or more speakers, repeatedly detecting a continuous-playback trigger, wherein detecting the continuous-playback trigger comprises determining that a number of unplayed audio tracks within the playback queue is less than a predetermined threshold number of audio tracks, and wherein detection of the continuous-playback trigger is independent of user input; and
in response to detecting each continuous-playback trigger:
(i) determining one or more additional audio tracks that are related to at least one audio track of the playback queue; and
(ii) adding the one or more additional audio tracks to the playback queue.

\* \* \* \* \*

UNITED STATES PATENT AND TRADEMARK OFFICE
CERTIFICATE OF CORRECTION

PATENT NO. : 12,236,068 B2
APPLICATION NO. : 18/519443
DATED : February 25, 2025
INVENTOR(S) : Keith Corbin et al.

Page 1 of 1

It is certified that error appears in the above-identified patent and that said Letters Patent is hereby corrected as shown below:

In the Claims

In Column 28, in Claim 4, Line 32, delete "to;" and insert -- to: --, therefor.

Signed and Sealed this
First Day of April, 2025

Coke Morgan Stewart
*Acting Director of the United States Patent and Trademark Office*